US011440843B2

(12) United States Patent
Kondratowicz et al.

(10) Patent No.: US 11,440,843 B2
(45) Date of Patent: Sep. 13, 2022

(54) MODIFIED GEOPOLYMER AND MODIFIED GEOPOLYMER COMPOSITE AND PROCESS FOR THE PRODUCTION THEREOF

(71) Applicant: SYNTHOS S.A., Oswiecim (PL)

(72) Inventors: Filip Lukasz Kondratowicz, Cracow (PL); Kamil Utrata, Cwiklice (PL); Marzena Mikoszek-Operchalska, Piasek (PL)

(73) Assignee: SYNTHOS S.A., Oswiecim (PL)

( * ) Notice: Subject to any disclaimer, the term of this patent is extended or adjusted under 35 U.S.C. 154(b) by 143 days.

(21) Appl. No.: 16/318,885

(22) PCT Filed: Jul. 20, 2017

(86) PCT No.: PCT/EP2017/068371
§ 371 (c)(1),
(2) Date: Jan. 18, 2019

(87) PCT Pub. No.: WO2018/015494
PCT Pub. Date: Jan. 25, 2018

(65) Prior Publication Data
US 2019/0276360 A1 Sep. 12, 2019

(30) Foreign Application Priority Data
Jul. 20, 2016 (EP) .................... 16461540

(51) Int. Cl.
C04B 28/00 (2006.01)
C08J 9/00 (2006.01)
C08J 9/16 (2006.01)
C08K 3/34 (2006.01)
C04B 14/02 (2006.01)
C04B 14/10 (2006.01)
C04B 14/30 (2006.01)
C04B 18/08 (2006.01)
C04B 18/10 (2006.01)
C04B 18/14 (2006.01)
C04B 20/02 (2006.01)
C04B 22/00 (2006.01)
C04B 22/16 (2006.01)
C04B 24/42 (2006.01)
(Continued)

(52) U.S. Cl.
CPC .......... C04B 28/006 (2013.01); C04B 14/024 (2013.01); C04B 14/106 (2013.01); C04B 14/305 (2013.01); C04B 18/08 (2013.01); C04B 18/106 (2013.01); C04B 18/146 (2013.01); C04B 20/023 (2013.01); C04B 20/026 (2013.01); C04B 22/0093 (2013.01); C04B 22/16 (2013.01); C04B 24/42 (2013.01); C04B 28/005 (2013.01); C08J 9/0066 (2013.01); C08J 9/141 (2013.01); C08J 9/16 (2013.01); C08J 9/18 (2013.01); C08J 9/224 (2013.01); C08J 9/232 (2013.01); C08K 3/34 (2013.01); C04B 2111/28 (2013.01); C08J 2201/03 (2013.01); C08J 2201/036 (2013.01); C08J 2203/14 (2013.01); C08J 2325/10 (2013.01); Y02P 40/10 (2015.11); Y02W 30/91 (2015.05)

(58) Field of Classification Search
CPC ........ C08F 12/00; C08F 12/08; C08F 112/00; C08F 112/08; C08F 212/00; C08F 212/08; C08K 3/32; C08K 3/34; C08K 5/16; C08K 5/17; C08K 5/0066; C08K 5/5313; C08K 5/5353; C08L 25/00; C08L 25/04; C08L 25/06; C08L 25/08; C08L 5/16; C08L 2666/36; C08L 2666/40; C08L 2666/54; C08L 2201/02; C08L 2203/14; C08J 9/0028; C08J 9/0038; C08J 9/0066; C08J 9/0095; C08J 9/04; C08J 9/141; C08J 9/16; C08J 9/18; C08J 9/228
See application file for complete search history.

(56) References Cited

U.S. PATENT DOCUMENTS 4,827,005 A 5/1989 Hilterhaus
4,871,829 A 10/1989 Hilterhaus
(Continued)

FOREIGN PATENT DOCUMENTS

CN 101068863 A 11/2007
CN 101835827 A 9/2010
(Continued)

OTHER PUBLICATIONS

Falah et al., "New composites of nanoparticle Cu(I) oxide and titania in a novel inorganic polymer (geopolymer) matrix for destruction of dyes and hazardous organic pollutants" *Journal of Hazardous Materials*, vol. 318: 772-782 (2016).
(Continued)

*Primary Examiner* — Irina S Zemel
*Assistant Examiner* — Jeffrey S Lenihan
(74) *Attorney, Agent, or Firm* — Nixon & Vanderhye P.C.

(57) ABSTRACT

The invention relates to a modified geopolymer and a modified geopolymer composite comprising additive. The additive is preferably an athermanous additive. The modification is with one or more water-soluble compounds, the water-soluble compound is preferably selected from phosphorus compounds, nitrogen compounds, copper compounds, silver compounds, zinc compounds, tin compounds and magnesium compounds. Also, it relates to compositions which contain the modified geopolymer or modified geopolymer composite. The compositions preferably comprise vinyl aromatic polymer and are in the form of a foam.

17 Claims, 1 Drawing Sheet

(51) Int. Cl.
*C08J 9/18* (2006.01)
*C08J 9/232* (2006.01)
*C08J 9/14* (2006.01)
*C08J 9/224* (2006.01)
*C04B 111/28* (2006.01)

(56) References Cited

U.S. PATENT DOCUMENTS

| | | | |
|---|---|---|---|
| 10,639,829 | B2 | 5/2020 | Kondratowicz |
| 2004/0227130 | A1 | 11/2004 | Hoerold et al. |
| 2008/0028994 | A1 | 2/2008 | Barlet-Gouedard et al. |
| 2008/0249199 | A1 | 10/2008 | Nising |
| 2010/0304165 | A1 | 12/2010 | Han et al. |
| 2012/0184635 | A1 | 7/2012 | Eberstaller |
| 2012/0264836 | A1 | 10/2012 | Felisari et al. |
| 2013/0284069 | A1 | 10/2013 | Dubey |
| 2014/0342156 | A1 | 11/2014 | Seo |
| 2016/0194247 | A1 | 7/2016 | Dubey |
| 2019/0218359 | A1 | 7/2019 | Kondratowicz et al. |
| 2019/0241472 | A1 | 8/2019 | Kondratowicz et al. |

FOREIGN PATENT DOCUMENTS

| | | | |
|---|---|---|---|
| CN | 102430419 | | 5/2012 |
| CN | 102597091 | | 7/2012 |
| CN | 102741191 | | 10/2012 |
| CN | 103449794 | | 12/2013 |
| CN | 103946181 | | 7/2014 |
| CN | 103980313 | | 8/2014 |
| CN | 104341612 | | 2/2015 |
| CN | 104803619 | | 7/2015 |
| CN | 105400131 | | 3/2016 |
| CN | 105462164 | | 4/2016 |
| EP | 0 167 002 | | 1/1986 |
| EP | 0 863 175 | | 9/1998 |
| EP | 0 981 574 | | 3/2000 |
| EP | 1 693 413 | | 8/2006 |
| EP | 1 758 951 | | 3/2007 |
| EP | 1 771 502 | | 4/2007 |
| EP | 1997849 | A1 * | 12/2008 |
| EP | 2 899 222 | | 7/2015 |
| FR | 3 019 176 | | 10/2015 |
| JP | 3018341 | | 3/2000 |
| KR | 101 431 002 | | 9/2014 |
| WO | 9616948 | | 6/1996 |
| WO | 9831644 | | 7/1998 |
| WO | 9839306 | | 9/1998 |
| WO | WO 98/51735 | | 11/1998 |
| WO | WO 2004/087798 | | 10/2004 |
| WO | WO 2005/123816 | | 12/2005 |
| WO | WO 2006/007995 | | 1/2006 |
| WO | WO 2006/058733 | | 6/2006 |
| WO | WO 2006/061571 | | 6/2006 |
| WO | WO 2008/061678 | | 5/2008 |
| WO | 2008113609 | | 9/2008 |
| WO | 2008145599 | | 12/2008 |
| WO | 2009009089 | | 1/2009 |
| WO | WO 2010/128369 | | 11/2010 |
| WO | 2010141976 | | 12/2010 |
| WO | WO 2012/146577 | | 11/2012 |
| WO | WO 2013/044016 | | 3/2013 |
| WO | WO 2015/097106 | | 7/2015 |
| WO | WO 2015/191817 | | 12/2015 |
| WO | 2016113338 | | 7/2016 |
| WO | WO 2016/113321 | | 7/2016 |
| WO | 2018015494 | | 1/2018 |
| WO | WO 2018/015490 | | 1/2018 |

OTHER PUBLICATIONS

Sazama et al. "Geopolymer based catalysts—New group of catalytic materials" *Catalysis Today*, vol. 164: 92-99 (2011).
Extended European Search Report issued in 16461540,3 dated Feb. 15, 2017.
International Search Report issued in PCT/EP2017/068371 dated Nov. 7, 2017.
Office Action issued in EP Appln. No. 17743315.8 dated Aug. 5, 2020.
Examination Report issued in CN App No. 201780044464,4 (dated Jan. 28, 2021).
International Search Report issued in PCT/EP2017/068390 dated Nov. 7, 2017.
Glad et al., "Geopolymer with Hyrdogel Characteristics via Silane Coupling Agent Additives", J. Am. Ceram. Soc., 97 [1] 295-302 (2014) (Year: 2014).
International Search Report issued in PCT/EP2017/068346 dated Oct. 19, 2017.
Hajimohammadi et al., "One-Part Geopolymer Mixes from Geothermal Silica and Sodium Alumiate", Ind. Eng. Chem. Res., vol. 47: 9396-9405 (2008).
Chinese Examination Report and English Translation issued for corresponding Chinese Application No. 201780044464.4 dated Apr. 28, 2022 (11 pages).

* cited by examiner

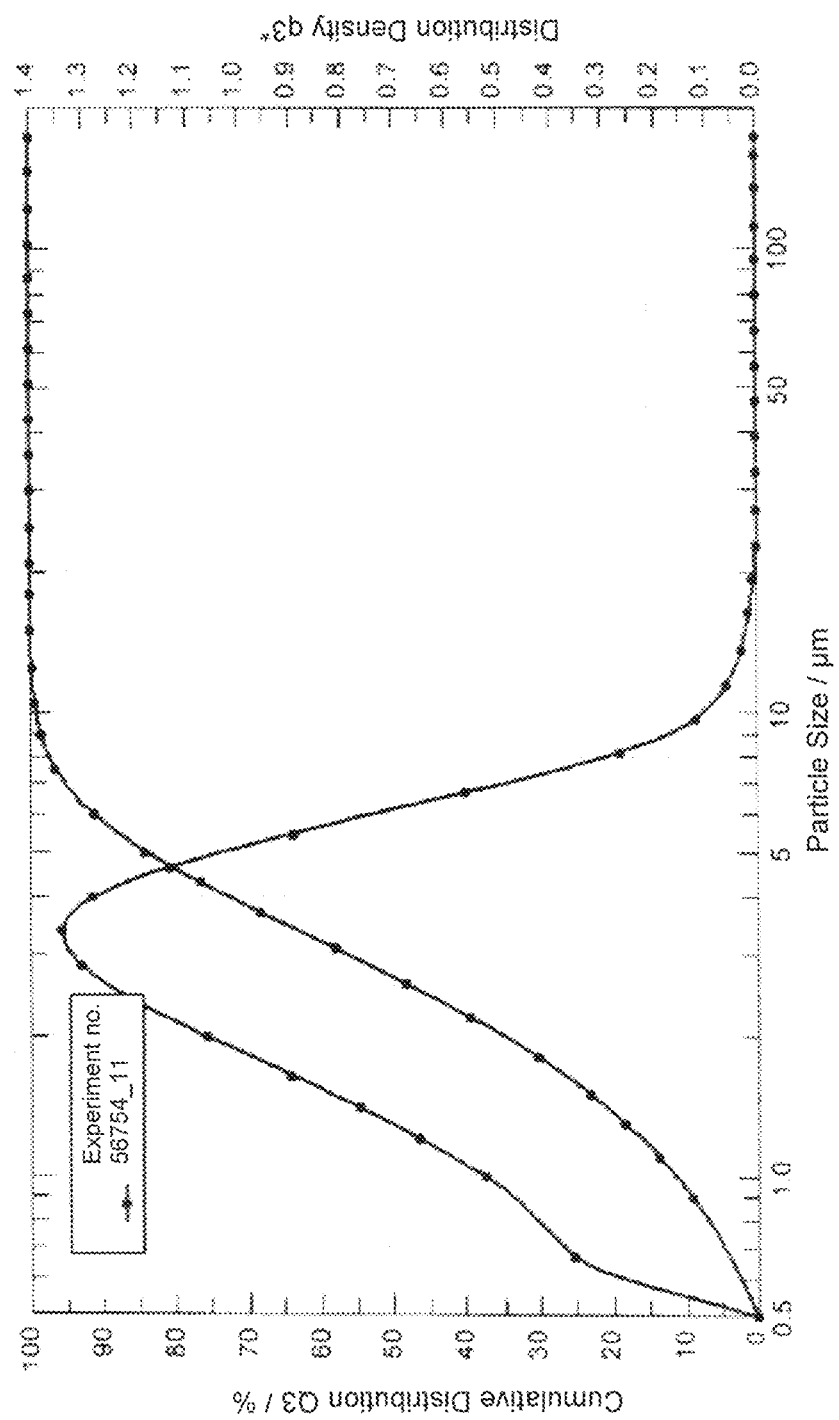

MODIFIED GEOPOLYMER AND MODIFIED GEOPOLYMER COMPOSITE AND PROCESS FOR THE PRODUCTION THEREOF

This application is the U.S. national phase of International Application No. PCT/EP2017/068371 filed Jul. 20, 2017 which designated the U.S. and claims priority to EP Patent Application No. 16461540.3 filed Jul. 20, 2016, the entire contents of each of which are hereby incorporated by reference.

The present invention relates to a modified geopolymer and a modified geopolymer composite comprising additive, and a process for the production of the modified geopolymer and the modified geopolymer composite. It further relates to the use of the modified geopolymer, the modified geopolymer in combination with additive, and the modified geopolymer composite comprising additive. Moreover, the invention relates to a process for the production of expandable vinyl aromatic polymer granulate. Finally, it relates to compositions which contain the modified geopolymer or modified geopolymer composite. The additive is preferably an athermanous additive.

WO2015/191817 A1 teaches geopolymer aggregates and their use in a variety of applications. Furthermore, WO2016/113321 A1 teaches that the addition of geopolymer or its composite as prepared with various types of athermanous additives makes it possible to maintain the polymer foam's self-extinguishing and mechanical properties in the same range as in an expanded polymer without addition of filler or any other athermanous additive, while at the same time the thermal conductivity can be decreased significantly. This is possible because the geopolymer itself gives fire resistance, and further encapsulates the particles of athermanous additive, especially of those additives that are based on carbon or mineral, and separates them from any disadvantageous interactions with the flame, the polymer, or the brominated flame retardant. The presence of geopolymer decreases thermal conductivity, because of its own heat radiation scattering effect.

Geopolymers are inorganic amorphous polymers with a three-dimensional, crosslinked alumina silicate structure, consisting of Si—O—Al—O bonds. The structure may be created in a sol-gel method by metal alkali activation of alumina silicate precursors. The formed gel product contains alkaline cations which compensate for the deficit charges associated with the aluminium-for-silicon substitution. During the dissolution of alumina silicate precursor and gel formation, an intermediate, aluminium rich phase is first formed which then gives way to a more stable, silicon-rich product. Under these conditions, free $SiO_4$ and $AlO_4^-$ tetrahedral units are generated and are linked to yield polymeric precursors by sharing all oxygen atoms between two tetrahedral units, while water molecules are released. The tetrahedral units are balanced by group I or II cations ($Na^+$, $K^+$, $Li^+$, $Ca^{2+}$, $Ba^{2+}$, $NH_4^+$, $H_3O^+$, which are present in the framework cavities and balance the negative charge of $Al^{3+}$ in tetrahedral coordination, i.e. $AlO_4^-$). This material was early investigated and developed by Davidovits after various catastrophic fire incidents in France in the 1970s. The term "geopolymer" was coined in view of the transformation of mineral polymers from amorphous to crystalline reaction through a geochemical process at low temperature and short curing time. Geopolymers are represented by the general chemical formula of $M_n[-(Si-O_2)_z-AlO]_n \cdot w\ H_2O$, in which M is an alkali metal, z is 1, 2 or 3 and n is the degree of polymerization. Based on the Si/Al molar ratio, three monomeric units can be defined: polysialate (Si/Al=1; Si—O—Al—O—), polysialatesiloxo (Si/Al=2; Si—O—Al—O—Si—O—) and polysialatedisiloxo (Si/Al=3; Si—O—Al—O—Si—O—Si—O—).

WO2013/044016 A2 teaches a product formed from a first material including a geopolymer resin material, a geopolymer resin, or a combination thereof by contacting the first material with a fluid and removing at least some of the fluid to yield a product. The first material may be formed by heating and/or ageing an initial geopolymer resin material to yield the first material before contacting the first material with the fluid.

The structure of geopolymers can be amorphous or semi crystalline, depending on the condensation temperature. Amorphous polymers are obtained at 20-90° C., whereas semi-crystalline polymers are obtained in the range 150-1200° C. This class of materials demonstrates ceramic-like properties, including extreme fire resistance. Geopolymers can be amorphous or crystalline materials. They possess a microstructure on a nanometre scale (as observed by TEM and measured by mercury porosimetry) which comprises small aluminosilicate clusters with pores dispersed within a highly porous network. The cluster size is typically between 5 and 10 nm. The synthesis of geopolymers from aluminosilicate materials takes place by the so-called geopolymerization process, which involves polycondensation phenomena of aluminate and silicate groups, with formation of Si—O—Al type bonds.

On the other hand, polymers such as vinyl aromatic polymers are known and are used for the preparation of expanded (foamed) products that are adopted in a variety of applications, of which the most important one is for thermal insulation. This is why there is a continuously increasing demand for polymers compositions (in particular when the composition is an expanded vinyl aromatic polymer composition) with low thermal conductivity as well as good mechanical and self-extinguishing properties.

One of the solutions to decrease the thermal conductivity of expanded vinyl polymers is the addition of athermanous additives. However, the presence of athermanous additives often leads to a deterioration of the self-extinguishing and mechanical properties of the expanded vinyl aromatic polymer (i.e. foam). Consequently, a higher concentration of flame retardant must be used to achieve suitable performance for passing the flammability test according to the German industry standard DIN 4102 (B1, B2) or European standard EN ISO 11925-2. Further, when using as athermanous additive certain types of carbon black having a highly developed active surface, such as a BET surface of above 40 $m^2/g$, or poor forms of graphite containing graphitic carbon in a concentration of well below 99% and having a high content of sulphur and ash, the self-extinguishing properties are insufficient in order to pass DIN 4102 (B1, B2) or at least EN ISO 11925-2 (which is a less demanding test).

On the other hand, the presence of small amounts of athermanous additives of the heat scatterer type, e.g. minerals (such as silicas, calcium phosphates and minerals with perovskite structure) does not cause a substantial deterioration of the flame retarded polymer foam's self-extinguishing properties. Rather, these properties are improved, but the decrease of the foam's thermal conductivity is not as pronounced as it would be in the case of foams comprising carbon-based additives, i.e. comprising athermanous additives of the heat absorber or of the heat reflector type (in particular carbon blacks and/or graphites).

Finally, there are certain types of additives, such as carbon-based athermanous additives of the heat absorber or heat reflector type (especially carbon black and graphite), that have properties that make these additives, by themselves, unsuitable for use in expandable vinyl aromatic polymers and expanded vinyl aromatic polymer foams. Thus, WO2015/097106 A1 relates to the use of a combination of a) a mineral component containing silica, calcium phosphate, or mixtures thereof, and b) carbon black, for decreasing the thermal conductivity of foamed vinyl aromatic polymer.

It was the object of the present invention to provide constituents for polymer compositions, which constituents improve thermal conductivity, in particular when the polymer is vinyl polymer, such as a vinyl aromatic foam, without adversely affecting mechanical and other product properties, such as self-extinguishing.

It has now surprisingly been found that these problems especially with expandable vinyl aromatic polymers can be overcome by the incorporation of a modified geopolymer, preferably in combination with (preferably athermanous) additive, or of a novel modified geopolymer composite comprising (preferably athermanous) additive.

The modified geopolymer and modified geopolymer composite according to the invention are prepared by a process for the production of a modified geopolymer or modified geopolymer composite, the process comprising
a) mixing of precursor for aluminate and silicate in alkaline solution, to form a sol-gel,
b) optionally adding of one or more additives to the sol-gel, to form a filled sol-gel,
c) mixing of the sol-gel or the filled sol-gel, to form geopolymer or filled geopolymer,
d) curing, drying and milling of the geopolymer or filled geopolymer, to form particles of geopolymer or of geopolymer composite,
e) optional dealkalization of the particles of geopolymer or of geopolymer composite, to reduce the content of alkali metal cation within the structure of the particles,
f) first filtration, and
g) second filtration,
wherein the process further comprises modification with one or more water-soluble compounds, and
h) obtaining the modified geopolymer or modified geopolymer composite.

It has been found in accordance with the present invention that the use of:
a) the modified geopolymer;
b) the combination of modified geopolymer with additive; or
c) the modified geopolymer composite comprising additive
in polymer compositions provides favourable properties to such compositions, especially with respect to thermal conductivity, in particular when such composition is in the form of an expanded foam, without adversely affecting the foam's self-extinguishing and mechanical properties.

Thus, the addition of modified geopolymer or its composite as prepared with various types of additives (preferably athermanous additives) makes it possible to maintain the foam's self-extinguishing and mechanical properties in the same range as in an expanded polymer without addition of filler or any other (athermanous) additive, while at the same time the thermal conductivity can be decreased significantly. This is possible because the modified geopolymer itself gives fire resistance, and further encapsulates the particles of additive, if present, especially of those additives based on carbon or mineral, and separates them from any disadvantageous interactions with the flame, the polymer, or the flame retardant. The presence of modified geopolymer further decreases thermal conductivity, because of its own heat radiation scattering effect. Moreover, the versatility of modified geopolymer allows it to incorporate a variety of compounds such as phosphorus compounds and nitrogen compounds which may contribute to fire resistance, whereas incorporated compounds such as copper compounds, silver compounds, zinc compounds, tin compounds and magnesium compounds may contribute to the composition's resistance to any microbial growth within or on such composition.

Also, the modification of geopolymer or geopolymer composite in accordance with the present invention gives materials having a better stability, such as improved adhesion to the polymers into which they are incorporated.

Moreover, the present invention allows one to use certain types of additives that would otherwise be unsuitable for use in expandable vinyl aromatic polymers and expanded vinyl aromatic polymer foams.

The present invention has the following aspects:
I) a process for the production of modified geopolymer or modified geopolymer composite;
II) the modified geopolymer or modified geopolymer composite;
III) the use of i) the modified geopolymer, of ii) the combination of a modified geopolymer with an additive and of iii) the modified geopolymer composite, in polymer foam;
IV) a process for the production of expandable vinyl aromatic polymer granulate that contains vinyl aromatic polymer, one or more propellants and i) a modified geopolymer, ii) the combination of a modified geopolymer with an additive or iii) a modified geopolymer composite in: 1) an extrusion process or 2) a suspension process;
V) a composition comprising polymer and i) a modified geopolymer, ii) the combination of a modified geopolymer with an additive or iii) a modified geopolymer composite; wherein the composition can be e.g. in the form of expandable vinyl aromatic polymer granulate, in the form of expanded vinyl polymer foam, or in the form of a masterbatch.

According to the present invention, the modified geopolymer is produced in several step process in which if needed additive (such as coke or anthracite or graphene oxide or metal oxide or sulfide or metal) during the process of production becomes encapsulated into the matrix of the geopolymer by chemical and physical bonding. This novel type of geopolymer according to the invention is suitable for performing a self-extinguishing action and further reducing the thermal conductivity properties of vinyl aromatic polymers and expanded foam products made thereof. Additionally, it was found that the self-extinguishing effect could be enhanced when a relatively small amount of modifier, e.g. a phosphorus compound such as phosphoric acid or ammonium polyphosphate, is used to alter the surface of geopolymer or geopolymer composite. It was found that this surface modification can help to reduce the amount of brominated flame retardant or completely eliminate the need to use any brominated flame retardant.

It was further found that better self-extinguishing properties are obtained when the content of cations such as sodium or potassium is limited below 200 ppm in modified geopolymer or modified geopolymer composite, when modified geopolymer or modified geopolymer composite are added to the product in the co-presence of brominated flame retardant. This is because especially sodium accelerates the thermal decomposition of brominated molecules, with creation of bromic acid and salt, respectively.

Also, geopolymer or geopolymer composite suspended in water can be ion exchanged. In was discovered that during or after the filtration process or following the dealkalization in which exchange of sodium or potassium cations by hydrogen cations is realized, or alternative to such dealkalization, an ion exchange can be performed. Such ion-exchanged particles of modified geopolymer or of modified geopolymer composite (incorporating ions of Ag, Zn, Cu, Cu, Ni, Sn, Mg) further improves the reduction of thermal conductivity of polymeric foams, acting additionally as antimicrobial agent.

In an additional aspect, it has been found that the use of a modified geopolymer or a modified geopolymer composite prepared from a mixture of aluminosilicate precursor and phosphoaluminate further enhances the self-extinguishing effect in vinyl aromatic polymer foams.

Also, this improvement is achieved when this new type of athermanous and flame retarding constituent is used in other expandable vinyl polymers such as polyethylene and polypropylene or even other type of polymers such as polyamides, polyurethanes, polyesters, polyimides or various types of resins.

BRIEF DESCRIPTION OF THE DRAWING

The accompanying FIGURE shows the average particle size distribution of geopolymer composite obtained in Example 1.

DETAILED DESCRIPTION

I) Process for the Preparation of Modified Geopolymer (Composite)

According to the first aspect, the present invention relates to a process for the production of a modified geopolymer or modified geopolymer composite. The process comprises
a) mixing of precursor for aluminate and silicate in alkaline solution, to form a sol-gel,
b) optionally adding of one or more additives to the sol-gel, to form a filled sol-gel,
c) mixing of the sol-gel or the filled sol-gel, to form geopolymer or filled geopolymer,
d) curing, drying and milling of the geopolymer or filled geopolymer, to form particles of geopolymer or of geopolymer composite,
e) optional dealkalization of the particles of geopolymer or of geopolymer composite, to reduce the content of alkali metal cation within the structure of the particles,
f) first filtration, and
g) second filtration.

The process further comprises modification with one or more water-soluble compounds, and h) obtaining the modified geopolymer or modified geopolymer composite.

Step a) is preferably performed by mixing of precursor for aluminate and silicate, to form a sol-gel, wherein the mixing is under alkaline conditions.

In a preferred embodiment, the mixing in step a) comprises the mixing of an aluminosilicate, a phosphoaluminate, an alkaline silicate and/or an alkaline aluminate. Thus, in a first step, the sol-gel is prepared, for instance from a mixture of aluminosilicate precursor and activator such as sodium aluminate or sodium disilicate, with addition of water. It is also preferred in the process according to the present invention to use sodium disilicate or sodium aluminate or their potassium analogues. Especially, it is preferred that the alkaline solution is a water-diluted sodium aluminate or sodium disilicate, in particular sodium aluminate.

In a further preferred embodiment, the mixing in step a) involves one or more materials selected from the group consisting of dehydroxylated kaolinite, metakaolin, metakaolinite, fly ash, furnace slag, red mud, thermal silica, fumed silica, halloysite, mine tailings, pozzolan, kaolin, and building residues,
preferably the mixing in step a) involves one or more materials selected from the group consisting of metakaolin, metakaolinite, furnace slag, fly ash, and fumed silica,
in particular the mixing in step a) involves metakaolin or metakaolinite, furnace slag, fly ash, or a mixture thereof.

In a further preferred embodiment, one or more of step a) and step c) comprises mixing in a conical screw mixer. Preferably both step a) and step c) comprise mixing in a conical screw mixer.

The mixing may be a high seed mixing of an aluminosilicate component with an alkaline silicate solution prepared from the sodium or potassium water glass or sodium aluminate or sodium disilicate or phosphoaluminate or mixture thereof, to form the sol-gel. Preferably, the activator is in particular sodium silicate water solution (so called water glass), dry sodium silicate, sodium disilicate, calcium silicate, potassium silicate, sodium aluminate, calcium aluminate, or potassium aluminate.

The weight ratio of alkali silicate or aluminosilicate solution to the metakaolin or fly ash or silica is preferably at most 1/1, more preferably at most 9/10, most preferably about 8/10. The weight ratio depends strictly on the molar ratio of Si/Al in the final modified geopolymer. The molar ratio of silicon versus aluminium determines the chemical structures, properties and thereby the field of application of the resultant modified geopolymers. Modified geopolymers can be classified in term of their chemical structure, taking the Si/Al molar ratio into account. If the molar ratio is 1, the geopolymer consists of (—Si—O—Al—O—) repeating monomeric units-poly(sialate), in the case of Si/Al=2, the geopolymer structures are enriched in additional silica tetrahedron units-(—Si—O—Al—O—Si—O)-poly(sialate-siloxo). A participation of the silica tetrahedron units into a chain increased with an increasing level of Si incorporation. Thus, a molar ratio equal to 3 provides (—Si—O—Al—O—Si—O—Si—O) structures-poly(sialate-disiloxo), whereas a molar ratio above 3 results in more rigid three dimensional silico-aluminate structures.

Regarding the applications, geopolymers may be categorized as follows: Si/Al=1 (typically bricks, ceramics, fire protection); Si/Al=2 (typically geopolymer cement, concrete, radioactive encapsulation); Si/Al=3 (typically heat resistance composites, foundry equipment, fibre glass composites); Si/Al>3 (typically sealants for industry); 20<Si/Al<35 (typically fire and heat resistance fibre composites).

Changes in the Si/Al ratio can drastically affect the flexibility of obtained modified geopolymer. According to the present invention, the smaller the value of the Si/Al ratio, the more flexible is the modified geopolymer. This was especially observed in the case of a Si/Al ratio of about 1, where aluminosilicates formed "more flexible" poly(sialate) structures, as compared to a 3D network of poly(sialate-siloxo) and poly(sialate-disiloxo) exhibiting shrinkage and cracks. From the literature is know that such flexibility was observed when the molar Si/Al ratio exceeds 30, with the much higher content of Si in matrix constituents.

Mixing is typically carried out at ambient temperature for a minimum of 1 minute and a maximum of 60 minutes. In this step after the addition of the alkaline silicate solution (so called water glass), silane may preferably be added to the gel, in order to improve adhesion of geopolymer in particular to carbon-based athermanous additives and later to the filled polymer. The concentration of silane is preferably in the range of from 0.01 to 10 wt. %, more preferably in the range of from 0.05 to 5 wt. %, most preferably from 0.1 to 3 wt. %.

Geopolymer or geopolymer composite may thus be modified by reaction with coupling agents, to obtain better adhesion to the vinyl aromatic expandable polymers. Different coupling agents may be used, depending on when the addition during the preparation of the geopolymer or the geopolymer composite takes place. However, this depends on the type of geopolymer used and the type of additive within the geopolymer composite.

Firstly, an adhesion of geopolymer or geopolymer composite to the polymer can be improved by its in situ modification (reaction) with silanes or organometallic titanates, zirconates (such us Ken-React produced by Kenrich Petrochemicals Inc.). The silane or titanate etc. can be added as weight percent per percent of geopolymer solid mass. It can be added in the range of 0.01-10.0 wt. % per 100 wt. % of geopolymer solid mass; in particular 0.1-5.0 wt. %, especially 0.5-3.0 wt. %.

Secondly, the adhesion of geopolymer or geopolymer composite to the vinyl aromatic polymer can be further improved by surface modification with silane or vinyl silane of the final powder form of prepared geopolymer or geopolymer composite. The silane or vinyl silane can be added as weight percent per 100 wt. % of powder. In can be added in the range of 0.01-10.0 wt. % per 100 wt. % of geopolymer solid mass; in particular 0.1-5.0 wt. %, especially 0.5-3.0 wt. %.

Another opportunity for hydrophobicity improvement is butadiene latex addition to the geopolymer gel. The resulting modified geopolymer or modified geopolymer composite has an improved adhesion to vinyl aromatic polymer, better dispersion of modified geopolymer or modified geopolymer composite in the polymer matrix, and improved mechanical properties. The concentration of butadiene latex is preferable in the range of from 1 to 50% wt. %, more preferable in the range of from 5 to 25 wt. %. The used latex can be butadiene copolymer latex eg. butadiene-styrene latex (e.g. LBS 3060 S from Synthos) and carboxylic modified butadiene latex e.g. (LBSK 5545 from Synthos).

Whilst various silanes can be used, the best adhesion performance is achieved when using aminopropyltriethoxysilane (e.g. Dynasylan AMEO from Evonik), aminopropyltrimethoxysilane (e.g. Dynasylan AMMO from Evonik), phenyltriethoxysilane (e.g. Dynasylan 9265 from Evonik), 3-methacryloxypropyltrimethoxysilane (e.g. Dynasylan MEMO form Evonik) and vinyltrimethoxysilane (e.g. Dynasylan VTMO from Evonik).

Thus, in a very preferred embodiment of all aspects of the present invention, silane is added, preferably in step a). When the silane is e.g. 3-methacryloxypropyltrimethoxysilane, the process further preferably comprises the addition of a butadiene latex in one or more of steps a), b) and c) (preferably, the addition of the butadiene latex is in one or more of steps a) and step b)).

In a further preferred embodiment, silane is added to the geopolymer composite, after optional step e) and preferably after step h). In this embodiment, the silane is preferably selected from aminopropyltriethoxysilane, aminopropyltrimethoxysilane, phenyltriethoxysilane, 3-methacryloxypropyltrimethoxysilane, and mixtures thereof.

It is most preferred that silane is added in an amount of from 0.01 to 10 wt. %, more preferably from 0.05 to 5 wt. %, most preferably from 0.1 to 3 wt. %, based on the weight of modified geopolymer or modified geopolymer composite.

Also, it is preferred that the additive is an athermanous additive, preferably selected from the group consisting of
   a. carbon-based athermanous additives,
   b. metal athermanous additives,
   c. metal oxide athermanous additives, and
   d. metal sulfide athermanous additives.

It is very much preferred that the process according to the first aspect includes optional dealkalization step e). Preferably, step e) comprises the addition of an acid solution, and subsequent drying. In particular, step e) comprises addition of an acid solution, washing with water, and subsequent drying.

Moreover, it is preferred that the modification with one or more water-soluble compounds is in step f), step g) and/or step h). Preferably, the modification is in step g).

The water-soluble compound is preferably selected from phosphorus compounds, nitrogen compounds, copper compounds, silver compounds, zinc compounds, tin compounds, and magnesium compounds. Preferably, the modification is with a phosphorus compound, in particular with a phosphorus compound selected from phosphoric acid and ammonium polyphosphate.

Also, step f) comprises preferably repulpation (re-forming of a pulp), more preferably the repulpation is with demineralized water or an acid solution, in particular the repulpation is with an acid solution.

Moreover, step f) preferably comprises a membrane squeeze.

It is further preferred that step g) comprises repulpation, more preferably the repulpation is with demineralized water.

Advantageously, dissolvers with high speed and mixing intensity up to 2000 rpm are used for any dealkalization and repulpation, to better remove metal cations from the geopolymer matrix.

Preferably, two steps of membrane slurry filtration are performed, where the second step takes place after a repulpation step. Further sequences of i) repulpation and ii) filtration can be performed, to further reduce the content of undesired metal cation.

The drying in step d) may comprise two drying steps. Preferably, the first drying is at a temperature within a range of from 20° C. to 80° C., and the second drying is at a temperature within a range of from 80° C. to 150° C.

Furthermore, the milling in step d) preferably comprises jet milling, and the jet milling process is performed with the use of hot air, to increase milling capacity by increasing the amount of adiabatic energy.

According to the present invention, the water content of the final modified geopolymer or modified geopolymer composite produced is preferably in a range of from 1 to 50 wt. %, preferably 2 to 30 wt. %, more preferably 3 to 20 wt. %.

Modified geopolymer or modified geopolymer composite as produced according to the present invention may be used together with brominated flame retardant. Because brominated flame retardants have limited compatibility with products having a certain sodium content, the sodium content of the modified geopolymer or modified geopolymer composite is therefore preferably less than 5000 ppm, more preferably less than 500 ppm, in particular less than 200 ppm, such as less than 100 ppm, or even less than 50 ppm, each calculated on dry mass.

If the modified geopolymer or modified geopolymer composite used/produced according to the present invention is not used together with brominated flame retardant, then the sodium content need not necessarily be low. In this embodiment, the sodium content of the (modified) geopolymer or (modified) geopolymer composite is preferably less than 50,000 ppm, more preferably less than 10,000 ppm, in particular less than 5,000 ppm, each calculated on dry mass.

The process for the production of a modified geopolymer or a modified geopolymer composite according to the present invention may thus proceed as follows:

a) High seed mixing of an aluminosilicate component with an alkaline silicate solution prepared from the sodium or potassium water glass or sodium aluminate or sodium disilicate or phosphoaluminate or mixture thereof, to form a sol-gel, b) optionally adding of second additive component to the sol-gel, to form a filled gel, c) mixing of the filled gel, to form filled modified geopolymer, d) curing, drying and milling, to give the particles of modified geopolymer or modified geopolymer composite, e) optional dealkalization of the particles of modified geopolymer or modified geopolymer composite, to remove metal cations from their structure, f) first step filtration with further salt elution followed by a repulpation process, preferably in acid solution,
second step filtration with further salt elution, preferably with the use of demineralized water, followed by modification with the use of water solutions of a phosphorus compound or a metal salts (to perform an ion exchange), and g) vacuum drying in the filter press and obtaining the modified geopolymer or modified geopolymer composite as granulate or powder.

Again, step a) is preferably performed by mixing of precursor for aluminate and silicate, to form a sol-gel, wherein the mixing is under alkaline conditions.

The first step a) may be a high speed mixing and dissolution of an amorphous phase of aluminosilicate precursor and/or phosphoaluminate component in an alkaline solution prepared from a water solution of sodium hydroxide and silicon dioxide (water glass) or a water solution of sodium disilicate or a water solution of sodium aluminate with or without addition of phosphoaluminate.

The activator may instead of sodium water glass be sodium aluminate or sodium disilicate or a mixture thereof. Also, the sol-gel may be prepared from a mixture of aluminosilicate precursor and activator such as sodium aluminate or sodium disilicate, with addition of water.

Particularly preferred precursors are dehydroxylated kaolinite, metakaolin or metakaolinite, but also fly ash, furnace slag, red mud, thermal silica, fumed silica, halloysite and a mixture thereof.

After activation and dissolution, the ortho-sialate monomer $[(HO)_3—Si—O—Al—(OH)_3]$ polycondensates and forms a sol-gel, so called "gel". The mixing is in a third step c) continued. Preferably, in step b), there is an addition of an additive, in micro or in nano powder form. During step a), b) or c), water can be introduced as a viscosity modification additive, and/or silane and/or latex as adhesion modifiers.

Once the curing (geopolymerization) process has substantially come to the stage that the material is partially solidified, drying of the geopolymer blocks in a fourth step d) evaporates excess of water. Some water may deliberately be kept in the material, preferably up to 20 wt. %, to improve material grindability (increase capacity) during the jet milling process with the use of hot air, preferably at a temperature in a range of from 100° C. to 200° C. Drying may be performed in a tunnel dryer, where blocks of material are placed on steel plates stacked as columns. The drying process is typically performed in two steps. The first step takes place at a lower temperature e.g. in the range of 20° C. to 100° C.; in this step further geopolymerization takes place with some water evaporation of about 10 to 20% of material mass. The second step is at a temperature e.g. in a range of from 100° C. to 200° C., to suitably reduce the water content to a level of 1 to 20 wt. % in the material. After that, "dry" blocks are crushed, to form particles of a size of a few millimetres (in the d50 range of below 1 to 100 mm). Then this granulate is jet milled, preferably with the use of hot air, to obtain a suitable particle size and high capacity per hour of production. Preferably, the average particle size (D50) is in the range of 0.1 to 10 µm.

The fifth and optional step e) is a dealkalization, to remove cations from the geopolymer matrix, preferably by addition of concentrated hydrochloric acid to the particles of geopolymer or geopolymer composite, as suspended in water. The reaction is preferably performed within 1 h and in a temperature range of from 50° C. to 90° C. in a heated/cooled dissolver, with an agitation speed in the range of 500 to 1500 rpm. Reaction typically results in the release of hydrogen sulphide and sulphur dioxide, as well as a pH change in the range of 3-13. Additionally, the viscosity of the slurry increases significantly due to change of particles surface and geopolymer interaction with water. Process water having a conductivity below 1000 µS/cm may be used for the dealkalization step.

Subsequently in step f), the first step membrane filtration is performed and finished with an inside press pressure in the range of 3-8 bar; received filtrate conductivity is typically in the range of 60,000 to 150,000 µS/cm. Afterwards, the salts are washed with the use of so called "process water", having a conductivity of below 1000 µS/cm and finally after minimum 20 minutes receiving the filtrate with a conductivity below 500 US/cm. At the end, a pressure (10-25 bar) membrane squeeze is applied, to increase the solids content in the precipitate cake from 50 up to 40 wt. %. This step avoids a strong thixotropic effect which would otherwise make granulation of the precipitated cake (to transport it to the repulpation stage) difficult, thus, the water content must be reduced.

The "cake" may then in step g) be granulated and suspended in a weak acid solution. An acidic suspension of a geopolymer or a geopolymer composite is affected in a dissolver, equipped with two types of agitators for avoiding agglomeration of suspended precipitate on the dissolver walls, a high speed (100-1500 rpm) agitator and a low speed (10-200 rpm) agitator. 1 h is typically enough to perform this repulpation step. Different acids could be used, such as hydrochloric acid, phosphoric acid, nitric acid or sulphuric acid. Organic acids may also be used. The elution could be performed as more repulpation—filtration steps, to improve reduction of sodium and other metal cations, especially if a sodium content in the final material below 100 ppm is desired. In some other applications, when the modified geopolymer or modified geopolymer composite is not used together with brominated flame retardants at the processing temperatures, such repeated elution may not be necessary. This depends on the final application of the modified geopolymer or modified geopolymer composite.

In a seventh step g) of the process, a second step of filtration is necessary. The slurry, which after repulpation has a pH in the range of 2-5, may be pumped to the membrane press and filtrated, ending with an inside press pressure in the range of 3-8 bars. Any remaining acid and salts may then be washed, giving a filtrate with a conductivity below 500 US/cm. Preferably, cold demineralized water is used, to reduce production cost related to water heating energy. However, with hot water having a temperature in a range of from 20° C. to 80° C., it is possible to accelerate elution and to reduce water consumption. Preferably, further salt elution is performed after the second filtration step, with the use of demineralised water.

In step g), the surface modification may be performed, for instance by treating the precipitated cake with a demineralized water solution of acid, preferably phosphoric acid or phosphates or its salts or polyphosphates or its salts. The surface modification by phosphorus and/or nitrogen based compounds may thus be performed with the use of an aqueous solution. The aqueous solution of the phosphorus and/or nitrogen based compound is transferred in one or more cycles through the filter press. If this step is needed because of the application of the resultant modified geopolymer or modified geopolymer composite, it is often performed before the membrane squeeze and vacuum drying in the membrane filter press.

The modification can alternatively be an ion exchange, with the use of a water solution of a salt such as copper chloride, silver nitrate, or magnesium sulphate, or some other salt which is soluble in cold or hot water.

Depending on the used ions, a final modified geopolymer or modified geopolymer composite could be an athermanous additive, a antimicrobial agent, a heavy metal scavenger from water, a humidity absorbent, an oil absorbent, an organic solvents absorbent, a catalyst for e.g. hydrogenation or dehydrogenation, a rheology modifier, a dye enhancer or a hydrophilic property enhancer for fibres in particular, a filler, a flame retardant, or a conducting additive. More properties are possible and can be achieved through choice of the particular modifier.

Modified geopolymer or modified geopolymer composite in form of precipitated cake in step h) is e.g. membrane squeezed, to increase the solids content up to 60 wt. %, and heated by the relatively low steam pressure of about 0.35 MPa to a temperature in the range of from 60 to 150° C. Thus, the vacuum drying may be performed in a membrane filter press, using steam for heating. In cycles, vacuum is applied and the pressure in the press is reduced to below 0.2 mbar. The cycles depend on the cake's thickness and the preferred temperature. Preferably, a cycling such as heating to a temperature of above 90° C. is performed, and then the pressure is reduced to below 0.7 mbar. The vacuum cycle is finished when the temperature drops below 70° C. and again heating is applied. The drying step is finished when the water content in the precipitate is in the range of 1 to 20 wt. %. After that, the cake is removed from the press automatically and granulated for example with the use of a cum crusher, or a screw crusher, or a hammer mill, or any other type of crusher, followed by deagglomeration in an impact mill with a rotor speed in the range e.g. from 1000 to 10000 rpm. After impact milling, the fine powder is recovered and ready for use.

Preferably, the additive as used in combination with modified geopolymer or as incorporated into modified geopolymer composite is one or more selected from the group consisting of a. carbon black, cokes (for example a petroleum coke and/or metallurgical coke), graphitized carbon black, graphite oxides, various types of graphite (especially poor and amorphous forms with a carbon content in the range of from 50 to 90%) and graphene or graphene oxide and various types of anthracite, b. titanium oxides, ilmenite, rutiles, chamotte, fly ash, fumed silica, hydromagnesite, huntite, barium sulphate, and mineral having perovskite structure, c. metal oxides, preferably titanium oxides, iron oxides, silicon oxides, chromium oxides, nickel oxides and more based on metals from element Table groups of IIIB, IV-VIIIA, I-VB, d. metal sulfides, preferably nickel sulfide, tungsten sulfide, copper sulfide, silver sulfide, and more sulfides are possible, e. nano particles of graphite oxides and titanium oxides, iron oxides, silicon oxides, chromium oxides, metal sulfides, metals such as nickel, barium sulphate and component having perovskite structure, tricalcium phosphate, preferably the modified geopolymer comprises one or more carbon-based additives selected from the group of heat absorbers and heat reflectors presented above, in particular the carbon-based additive is carbon black, graphite, graphite oxide, graphene oxide, coke, anthracite or a mixture thereof.

The second and optional step is thus the incorporation of additives, preferably one or more athermanous additives. Preferably such additive could be carbon black, graphite, coke, anthracite, graphite oxide.

In particular, the following cokes could be used: petroleum coke, metallurgical coke, shot coke, sponge coke, fluid coke, beaded coke, needle coke, pitch coke or anode coke.

In particular, the following anthracites could be used: green anthracite, semianthracite, anthracite, meta-anthracite or gas calcined anthracite and electrically calcined anthracite or dealkalized and desulphurized types of anthracite.

Additionally, other types of carbon based additive are possible, such as sea coal, graphene oxide, nanotubes or carbon fibers.

In a preferred embodiment of all aspects of the invention, additive a. is selected from coke, graphitized carbon black, graphite oxides, graphite, anthracite, graphene oxide, and nano-graphite and carbon nanotubes (single and multilayer). Most preferred in all embodiments of the invention is that the athermanous additive is a carbon athermanous additive selected from graphene oxide, nano-graphite, and mixtures thereof.

Alternatively, metal oxides could be added, preferably, titanium dioxide, iron oxide, chromium oxide, silicon oxide or nickel oxide or their nanoforms.

Further alternatively, metal sulfides such as tungsten sulfide or nickel sulfide are possible as additives.

The incorporation of ilmenite, rutile, perovskite mineral, barium sulphate, chamotte, fumed silica, fly ashes, hydromagnesite/huntite mineral or the mixture of all or minimum two additives to the forming geopolymer gel is likewise preferred.

After (optional) additive incorporation, the high shear mixing is continued, and further geopolymerization takes place, and additive is physically encapsulated or chemically reacted by growing chains of geopolymer, thus the surface becomes modified.

The additive, or a minimum of two additives, is preferably added in an amount of from 0.01 to 80 wt. %, more preferably from 0.05 to 60 wt. %, most preferably from 0.1 to 50 wt. % depending on the type of the additive or additive mixture, based on the weight of geopolymer composite. Different mixtures and different ratios between the additives are possible. After addition of additive, or mixture of at least two additives from the above proposed, the thixotropic gel is further high speed mixed, to result in a homogenous consistence. Water can then be added, to regulate the final viscosity. The water is added in a preferred ratio from 1/10 to 10/10 or depending on additive type and its bulk density as well as hydrophilic properties and specific surface.

For the geopolymer composite synthesis the following athermanous additives are preferably used:
a) carbonaceous substances such as various grades of carbon black including furnace black, lamp black, channel black, thermal black and acetylene black; various grades of petroleum coke—including needle, regular and sponge coke, calcined petroleum coke; various grades of natural and synthetic graphite.
b) mineral substances, synthetic and natural ones, such as titanium dioxide, rutile, ilmenite, minerals with perovskite structures, kaolin, mica, talc, barium sulphate, tricalcium sulphate, tricalcium phosphate, silica and more possible substances according to WO 2006/058 733 A1, EP 0 863 175, EP 0 981 574, EP 1 758 951, EP 1 771 502 A2, WO 2004/087798 A1, WO 2008/061678 A2, WO 2006/061571 A1, and the other existing applications.

Preferably, the process specifically proceeds as follows:

Mixing of the aluminosilicate component, e.g. a dehydroxylated kaolinite (metakaolin or metakaolinite) mixed, with furnace slag, or fly ash, or thermal silica, in a weight ratio range of from 10/1 to 10/9, preferably from 10/1 to 10/7 in a water alkali solution of silicate, generally sodium or potassium silicate, or in an alkaline solution prepared from water and sodium aluminate or sodium disilicate as starting materials. In the high speed mixing process according to the present invention, the dissolution and hydrolysis of the aluminosilicate component takes place in alkali solution and results in the formation of $[M_z(AlO_2)_x(SiO_2)_y MOH \cdot H_2O]$ gel. The dissolution time depends on amorphous silica content in aluminosilicate component, fly ash and other additives, temperature as well as type of mixing. The polymerization can be described by the following equations:

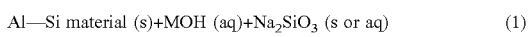

$$\text{Al—Si material (s)} + \text{MOH (aq)} + \text{Na}_2\text{SiO}_3 \text{ (s or aq)} \quad (1)$$

$$\text{Al—Si material (s)} + [M_z(AlO_2)_x(SiO_2)_y \cdot n\text{MOH} \ast m\text{H}_2\text{O}] \text{ gel} \quad (2)$$

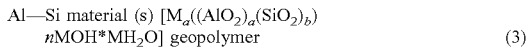

$$\text{Al—Si material (s)} [M_a((AlO_2)_a(SiO_2)_b) n\text{MOH} \ast M\text{H}_2\text{O}] \text{ geopolymer} \quad (3)$$

The formation of gel is the dominant step in the geopolymerization reaction and it highly depends on the mixing type, which takes place after dissolution. The mixing is continued for a suitable time period to achieve the best dissolution of aluminosilicate and is preferably performed in a high speed, high shear mixer. The mixing time should be adjusted depending on the amount of loaded components and is preferably in a range of from 1 to 60 min.

It was found that conical screw mixers with the central screw agitator used in various applications are particularly suitable to prepare homogenous geopolymeric gel. In the production, a quick batching stage is performed, thus it is required to provide high speed mixing and to prepare the gel within 1 minute of even less. To achieve such conditions, a mixing speed in the range from 100 to 1000 rpm, preferably from 150 to 700 rpm, more preferably from 200 to 500 rpm may be used. The other favourable feature of such mixers is the possibility of a full opening of the bottom and emptying of the mixer off the very viscous melt, thanks to the agitator's movement directly into the mould.

The filled geopolymer in the form of a thixotropic gel is thus removed from a conical mixer because of the agitator movement, directly to the moulds. The vibration is applied simultaneously to leveled the thixotropic melt and the mould is closed immediately, to prevent water evaporation. Closed moulds are then transported to the curing room. A transport system and a curing system similar to that used commonly in the concrete industry could be applied. During this process, the geopolymer polymerization continues. Also, the time of geopolymer polymerization is important, thus the curing is preferably continued during a minimum of 1 h and a maximum of 48 h, and most preferable is a curing time of 24 h. After this process, the ready blocks of geopolymer contain from 20 to 50 wt. % or more of water, depending on how much excess water was added to regulate the gel viscosity. It was also found that excess of water significantly influences the curing time. The curing time is also strictly related to the molar ratio of Si/Al. At a lower ratio Si/Al≤1 or <2, a longer curing time was observed. The reaction accelerates significantly when Si/Al>3.

After the curing time, moulds are dismantled and blocks of geopolymer or geopolymer composite are transported to the drying stage. On the production scale, the ready blocks are stored on steel plates, then placed on racks in columns, in closed tunnel dryer chambers wherein warm air having a temperature ranging from 30 to 150° C., most preferably from 60 to 130° C., is driven from the side through the racks and excess water is removed slowly over 24 h for example. Normally, from to 50 wt. % of water can be removed from the geopolymer blocks during 24 h of drying in a temperature range of 30 to 150° C. The process can be prolonged according to needs and size of the blocks or water excess which should be removed before the grinding process. In particularly, a two-step drying process is preferred. To finalize the geopolymerization and avoid formation of zeolites during 6 to 8 h, the temperature is kept in a range of 50-80° C., more preferably 60-70° C. After first-step drying is finished, the temperature is raised above 100° C. and kept in a range of 110 to 130° C., preferably 120° C., in this stage we do not exclude partial formation of zeolites in the geopolymeric structure.

After drying of the blocks, the preliminary milling of these blocks is performed, to form aggregate with a particle size of from 0.1 mm to 10 mm. A larger size is possible if required. After this, the suitable particle size can be obtained by using various types of mills, preferably ball mills, fine impact mills, table roller mills or jet mills preferably; it is preferred that the mill should be equipped with a particle size classifier. A preferred particle size is an average particle size (D50) in a range of from 0.01 to 10 μm, D90 in a range of from 0.5 to 15 μm, D99 in a range of from 1 to 20 μm, D100 in a range of from 1.5 to 30 μm and D10 in range of 0.001 to 0.5 μm; or the particles can be milled only preliminarily to obtain particles sizes in a range of from 0.01 to 200 μm.

A further stage is the optional dealkalization, which consist of a reaction of metal cations which are present in the geopolymeric structure with the hydrochloric acid as present in the aqueous suspension. Other acids may be used, such as sulphuric acid, phosphoric acid, nitric acid, carbonate acid or acetic acid. The dealkalization process is performed in the jacketed agitated reactor equipped with a frame stirrer to avoid material sticking to the reactor walls, high shear dissolver to avoid agglomeration, thermocouple, pH and ion conductivity meter. A mixing speed in the range of 100 to 1000 rpm is used.

As a first part of this dealkalization step, process water with a conductivity below 1000 μS/cm, preferably below 500 US/cm, and more preferably below 300 μS/cm or demineralized water with conductivity below 5 μS/cm, and geopolymer or geopolymer composite powder (with a particle size of from 0.01 to 200 μm) are poured into the reactor while stirring vigorously. A suitable mass ratio of geopolymer or geopolymer composite powder to water is in the range from 1.0:0.5 to 1:10, more preferable from 1:1 to 1:5 and most preferable from 1:2 to 1:3.

The second part of this dealkalization step is the addition of concentrated hydrochloric acid to the mixture, preferably about 30% concentrated. Before the acid addition, the pH value resulting from the addition of geopolymer or geopolymer powder is in the range of 10-12, more preferably the pH value is in the range of 11-12 and conductivity of approx. 9,000 to 12,000 μS/cm. After addition of hydrochloric acid and a reaction time of about 1 h, the resulting pH value is in a range of 3-4 and conductivity increases significantly, to 40,000 to 90,000 μS/cm, more preferably from 50,000 to 80,000 US/cm. The dealkalization process is typically performed at a temperature in the range of 20-100° C., more preferable of 40-90° C. and most preferable of 60-80° C. The temperature increases after acid treatment, and then it decreases gradually.

After dealkalization, the resulting viscous suspension, having a temperature of 60-80° C., is pumped to the first step of filtration, f). The amount of process or demineralized water to wash the filtrated cake is in the range of 1.5 to 5.0 mass excess per weight of the mass in the filter press. Filtration is continued, until the pressure inside the press rises to the level of 4 to 6 bar, preferably 5 bar. The starting filtrate's pH value is the range of 3 to 5 and conductivity from 30,000 to 80,000 μS/cm. Filtration is continued over a minimum of 20 minutes and after this time, the filtrate's pH value increases to 6-7 and conductivity decreases to below 500 US/cm, preferably below 400 μS/cm, which is recognized as the washing end, thus the membrane squeeze is applied, preferably with a pressure in the range from 12 to 20 bar, more preferably from 15 to 18 bar. The precipitated cake, with a dry mass content in the range of 50-65 wt. %, preferably 55-60 wt. %, falls to the screw granulator hopper after press release and is granulated to the small pieces and transported by the belt conveyer to the repulpation stage. The filtrate from the first step filtration is directed to the desalination process, to produce demineralized water, and back to the repulpation stage.

Preferably, the repulpation of the granulated cake is in demineralized weak water solution of hydrochloric acid. Other acids or salts e.g. phosphoric acid, ammonium polyphosphate, ammonium bicarbonate, magnesium sulfonate can be used. A suitable concentration of acid in the water is in the range from 0.01 to 10 wt. %. The mass ratio of water to the precipitate is between 1:1 to 1:5. The process is conducted in a high shear dissolver with an agitation speed above 700 rpm. Repulpation is continued for approx. 1 h, to have a long enough time for the contact of acid with the particles of geopolymer or geopolymer composite. After the specified time, the suspension is transferred to the second filtration step g).

The second step membrane filter press filtration is preferably coupled with a vacuum cake drying. Filled geopolymer slurry after repulpation is fed to the filter press and cloudy filtrate is recirculated to the feeding spigot. A clean filtrate is directed to a waste stream for desalination process or could be used in the dealkalization. Again, filtration is finalized when the inside press pressure reaches from 4 to 6 bar. The filtrate has a pH in the range of 6-7 and a conductivity below 300 μS/cm.

Next, the filter cake is washed with demineralized water, in order to remove any remaining salts. The step is finished when the ion conductivity of the filtrate is below 100 μS/cm and at a pH value between 6-8, which takes a minimum of 20 min. The membrane squeeze is necessary to decrease the water content in the filter cake below 50 wt. %, preferably below 40 wt. %. Then, the cake (which is characterized by a solid mass content of about 60-55 wt. %) is heated above 100° C., preferably above 110° C., and steam and vacuum drying are applied in order to achieve a water content in the filter cake below 10 wt. %. The sodium content after dealkalization, repulpation, salts washing and filtration is much below 1000 ppm.

The salts elution process from the cake may be performed at a higher temperature, e.g. 40-90° C., in order to accelerate cations diffusing from the geopolymer composite. The elution process can be performed at a temperature in a range of from 5° C. to 100° C., preferably from 20° C. to 90° C., in particular from 30° C. to 80° C. When increasing the temperature by 20° C., the elution process can be shortened in time by about 50%, especially when the process temperature is in a range of from 30° C. to 80° C., in particular 40° C. to 70° C.

The geopolymer's matrix has a strong ability to be an ion exchange material. The negative charge in the amorphous structure of geopolymers is not localized and is more or less uniformly distributed in the framework. Charge-balancing cations can act as fully hydrated and mobile or as unhydrated and coordinated to oxygen atoms. The main factors determining the geopolymer preference for exchanging a cation over another one are ionic radius, hydration energy, and locations of cations. Therefore, geopolymer cationic exchange capacity allows for a wide range of chemical and physical modification, in order to change thermal and morphological properties. The geopolymer of geopolymer composite could be modified by washing with salt or acids water solutions before membrane squeezing and vacuum drying, in order to incorporate proper cations to increase self-extinguishing properties. It was surprisingly found that geopolymer composite, modified with phosphoric acid or organic, inorganic phosphoric acid esters or polyesters or their salts e.g. ammonium polyphosphates (APP), triethyl phosphate, triphenyl phosphate allows to decrease or even fully dispense with halogenated flame retardants in expanded vinyl aromatic polymer foams. The specific salt for the ion exchange, or the specific acid water solution to modify the geopolymer or geopolymer composite, could be used with a concentration in the range of 0.01 to 20%, preferably 0.05 to 15%, more preferably from 1 to 10%.

The drying of precipitate at the end preferably takes place at a higher temperature, such as above 100° C. (to provide quick evaporation of water, 100 to 250° C. is preferred) and a vacuum, preferably vacuum means low pressure at a level of 0.2 mbar. After drying, the cake is preferably deagglomerated by the impact mill, preferably with a slow speed feeding and high speed of the rotor pin in the range of 1000 to 1000 rpm, preferably from 5000 to 8000 rpm, to have the same particle size as after the jet milling step.

Whilst a process to prepare modified geopolymer or modified geopolymer composite has been described in detail as a first aspect of the present invention, an alternative process is described in international patent application entitled "Process for the production of geopolymer or geopolymer composite" (PCT/EP2017/068346), filed on even date herewith, the disclosure of which application is incorporated herein in its entirety. PCT/EP2017/068346 claims priority from EP16461542.9 filed on Jul. 20, 2016. According to this alternative process, modified geopolymer is prepared in a process comprising a) mixing of precursor for aluminate and silicate in alkaline solution, to form a sol-gel,
b) optionally adding of one or more additives to the sol-gel, to form a filled sol-gel,
c) adding water to the sol-gel or filled sol-gel, to form a diluted sol-gel or diluted filled sol-gel,
d) mixing of the diluted sol-gel or diluted filled sol-gel, to form geopolymer or geopolymer composite,
e) obtaining a suspension of geopolymer or geopolymer composite,
f) optional reduction of the content of alkali metal cation within the structure of the geopolymer or geopolymer composite, and
g) obtaining the geopolymer or geopolymer composite.

Step e) of this alternative process comprises
e1) decantation,
or
  e2) adding of an organic phase, emulsifying, and stripping of the organic phase.

Step a) is preferably performed by mixing of precursor for aluminate and silicate, to form a sol-gel, wherein the mixing is under alkaline conditions.

This alternative process may comprise modification with one or more water-soluble compounds, preferably the modification is in one or more of step f) and step g), resulting in modified geopolymer or modified geopolymer composite, respectively. The water-soluble compound is again preferably selected from phosphorus compounds, nitrogen compounds, copper compounds, silver compounds, zinc compounds, tin compounds, and magnesium compounds. Preferably, the modification is with a phosphorus compound, in particular with a phosphorus compound selected from phosphoric acid and ammonium polyphosphate.

II) Process for the Preparation of Modified Geopolymer (Composite)

In a second aspect, the invention relates to II) modified geopolymer and modified geopolymer composite.

Modified geopolymer according to the invention is derived from geopolymer and is modified with one or more water-soluble compounds, preferably selected from phosphorus compounds, nitrogen compounds, copper compounds, silver compounds, zinc compounds, tin compounds, and magnesium compounds. The modified geopolymer is preferably in the form of a modified geopolymer composite, and the modified geopolymer composite preferably comprises one or more of the above-identified (preferably athermanous) additives.

Preferably, the modified geopolymer or modified geopolymer composite is obtainable and is in particular obtained according to the process for the production of modified geopolymer or modified geopolymer composite of the invention, as described above as the first aspect of the invention.

In the modified geopolymer composite according to the present invention, the amount of (preferably athermanous) additive is preferably from 0.01 to 80 wt. % by weight, calculated on the geopolymer composite dry mass.

Modified Geopolymer Composite

The modified geopolymer composite used in accordance with the invention is preferably synthesized from metakaolin (modified geopolymeric binder based on fire clays—meta-clay) and sodium or potassium polysilicate solution, preferably a sodium solution may be used, and/or carbon blacks and/or petroleum cokes and/or graphite and/or chamotte and other crystalline fire clays as cross linking precursors and/or titanium dioxide, and/or barium sulphate and/or synthetic rutile and/or ilmenite and/or perovskite and/or fumed silica and/or fly ashes and/or hydromagnesite/huntite mineral can be used as well.

The modified geopolymer composite can e.g. contain up to 70% of athermanous additive from the group of carbon-based additives, such as carbon blacks and/or petroleum cokes and/or graphite and/or graphene oxide and/or nano-graphite. Various types of carbon black, petroleum coke graphite, graphene oxide and nano-graphite can be added. In addition, it is possible to incorporate graphitized carbon black together with synthetic or natural graphite or alone. The concentration of additives in the modified geopolymer composite depends on the modified geopolymer composite's viscosity, and this is related to the (athermanous) additive's particle size, and the BET surface area of the particular additive.

The modified geopolymer composite powder is preferably characterized by the following parameters:
  a mean particle size distribution, as measured by laser diffraction, specifically using a Malvern Mastersizer apparatus according to the standard ISO 13320-1. The mean particle size should be in the range of from 0.01 to 200 µm, preferably of from 0.1 to 50 µm, more preferably of from 0.5 to 30 µm, and especially of from 1 to 25 µm.
  a BET surface in the range from 0.01 to 10,000 $m^2/g$, as measured by a Gemini 2360 surface area analyzer from Micromeritics, according to ISO 9277:2010.
  a moisture content in the range of from 0.1 to 10% per total mass of modified geopolymer composite.

Kaolinite and Metakaolin

Kaolinite used according to the present invention is a clay mineral composed of aluminosilicate oxides with the formula $Al_2O_3 \cdot 2SiO_2 \cdot 2H_2O$. It is a layered silicate mineral, with one tetrahedral sheet linked through oxygen atoms to one octahedral sheet of alumina octahedra.

Endothermic dehydration of kaolinite begins at 550-600° C., producing disordered metakaolin, but continuous hydroxyl loss is observed up to 900° C.

The calcination of kaolin clay at 550-900° C., preferably 600-800° C. and more, more preferably 600-700° C., results in metakaolin that is preferably used according to the invention.

The metakaolin used according to the invention is preferably composed of:
  aluminium oxide in an amount in the range of 25-50 wt. %, preferably 30-45 wt. % and more preferably 33-43 wt. %.
  silicon dioxide in an amount in the range of 35-70 wt. %, preferably 50-65 wt. % and more preferably 55-60 wt. %.

Titanium Dioxide

Titanium dioxide occurs in form of three common crystalline phases, namely rutile, anatase and brookite. Rutile is the most stable form, while anatase and brookite slowly convert to rutile upon heating above 550° C. and 570° C. All three forms of titanium dioxide have six co-ordinated titanium atoms in their unit cells. Rutile and anatase structures are tetragonal. Titanium dioxide is characterized by its excellent processing properties, ease of wetting and dispersion. Moreover, it is able to absorb infrared radiation, thus in this manner was used in the synthesis of modified geopolymer composite of the invention, to decrease thermal conductivity of the expanded vinyl aromatic polymer (as measured according to ISO 8301).

The titanium dioxide preferably used in the present invention has a $TiO_2$ content in the range of 70.0-99.9 wt. %, as measured according to standard PT-5006, preferably 85.0-99.0 wt. %, more preferably from 90-98 wt. %. The total $Al_2O_3$ and $SiO_2$ content is in the range of 0.1 to 30 wt. %, preferably in the range of from 1 to 10 wt. %, more preferably of from 3 to 5 wt. %, as measured according to PT-5003 and PT-5002 standards. The density is preferably 1 to 7 $kg/dm^3$, as measured according to DIN ISO 787 standard, preferably 2 to 6 $kg/dm^3$, more preferably to 5 $kg/dm^3$. The average particle size is in the range of 0.01 to 100 µm, preferably in the range of 0.1 to 30 µm, more preferably 0.5 to 25 µm, as measured by a Malvern Mastersizer apparatus according to the standard ISO 13320-1.

Ilmenite

Ilmenite is a titanium-iron oxide mineral ($FeTiO_3$), weakly magnetic, considered as the most important ore of titanium. Ilmenite most often contains appreciable quantities of magnesium and manganese and the full chemical formula can be expressed as $(Fe, Mg, Mn, Ti)O_3$. Ilmenite crystallizes in the trigonal system. The crystal structure consists of an ordered derivative of the corundum structure.

The ilmenite as used according to the invention preferably has a $TiO_2$ content in the range of from 10 to 70 wt. %, preferably of from 30 to 50 wt. %, more preferably of from 40 to 45 wt. %. It is preferred that the total Fe content is from 5 to 50 wt. %, preferably from 20 to 40 wt. %, more preferably from 33 to 38 wt. %. The content of $SiO_2$, MnO, MgO, Cao, $Al_2O_3$ and $V_2O_5$ is in the range of from 0.1 to 20 wt. %, preferably in the range of from 1 to 15 wt. %, more preferably in the range of 5 to 10 wt. %. The density is preferably from 2 to 6 $kg/dm^3$, as measured according to DIN ISO 787, preferably 3 to 5 $kg/dm^3$. The average particle size is in the range of from 0.01 to 100 µm, preferably in the range of from 0.5 to 30 µm, as measured by laser diffraction, using a Malvern Mastersizer apparatus according to ISO 13320-1.

Rutile

Rutile is a mineral composed primarily of titanium dioxide ($TiO_2$). Natural rutile may contain up to 10% of iron and significant amounts of niobium and tantalum. Rutile crystallizes in the tetragonal system.

The titanium dioxide used in the present invention preferably has a $TiO_2$ content in the range of from 70.0 to 99.9 wt. %, preferably of from 85.0 to 99.0 wt. %, more preferably from 90 to 93 wt. %. The $SiO_2$ content is in the range of 0.1 to 10 wt. % preferably in the range from 1 to 5 wt. %, more preferably from 2 to 4 wt. %. The density is from 1 to 7 $kg/dm^3$, as measured according to DIN ISO 787, preferably 2 to 6 $kg/dm^3$, more preferably 3 to 5 $kg/dm^3$. The average particle size is in the range of 0.01 to 100 µm, preferably in the range of 0.1 to 30 µm, more preferable is range of 0.5 to 25 µm, measured by laser diffraction, using a Malvern Mastersizer apparatus according to the ISO 13320-1.

Perovskite

A mineral of the general formula $ABX_3$ is preferably present, A and B being cations and X being anions, wherein the mineral has perovskite crystal structure (in the following "mineral having perovskite structure", or "perovskite"). This type of additive reduces flame development by the creation of char with higher viscosity and thus reduces dripping and flaming.

The perovskite as preferably used in accordance with the invention has the following specific properties:

a crystalline structure with the general formula $ABX_3$ where A and B are two cations of different sizes and X is an anion that bonds to both, the A atoms are larger than the B atoms, and its ionic radii close to that on the anion X thus they can form together a cubic (orthorhombic) close packing with space group Pm3m. In the structure the B cation is 6-fold coordinated and A cation 12-fold coordinated with the oxygen anions. For the stoichiometric oxide perovskite, the sum of oxidation states of A and B cations should be equal to six.

Preferably, A is selected from the group consisting of Ca, Sr, Ba, Bi, Ce, Fe, and mixtures thereof. Moreover, the A atom can be represented also by hybrid organic-inorganic groups, e.g. $(CH_3NH_3)^+$.

The B atom is preferably represented by Ti, Zr, Ni, Al, Ga, In, Bi, Sc, Cr, Pb as well as ammonium groups. The X atom is preferably represented by oxygen or halide ion, or mixtures thereof.

Among the most important representatives of minerals having perovskite structure are dielectric $BaTiO_3$, high-temperature semiconductor $YBa_2Cu_3O_7x$, materials exhibiting magneto-resistance $R_{1-x}A_xMnO_3$, where $R=La^{3+}$, $Pr^{3+}$ or other earth ion, $A=Ca^{2+}$, $Sr^{2+}$, $Ba^{2+}$, $Bi^{2+}$, $Ce^{2+}$, and multiferroic materials.

Perovskites have large reflectance properties in the broad wavelength and a high optical constant, even in the far-infrared region. Hence, perovskites are infrared reflective materials that reflect infrared rays included in sunlight or the like and reduce the level of absorbed infrared rays.

Perovskites according to the invention are preferably characterized by:

a BET surface size in the range of 0.01 to 100 $m^2/g$ as measured according to the ASTM C1069 and ISO 9277 as explained above. The BET active surface area is preferably in the range of 0.05 to 50 $m^2/g$ and more preferable in the range of 0.1 to 15 $m^2/g$.

a particle size in the range of 0.01 to 100 µm as measured according to the standard procedure using a Malvern Mastersizer 2000 apparatus. The particle size is preferably in a range of 0.1 to 30 µm, more preferably in the range of 0.5 to 25 µm.

Sodium Activator (Glass Water) as Preferred Alkaline Silicate

Glass water is a water soluble alkali metal silicate with a certain molar ratio of $M_2O:SiO_2$ (M representing Na or K, or a mixture of Na and K), corresponding to the chemical formula $M_2O:2SiO_2*nH_2O$, n being comprised between 2 and 6. In the present invention, M is in one embodiment preferably Na.

Alternatively, M is K. Although potassium silicate is more expensive than sodium silicate, the properties of the modified geopolymers prepared with potassium silicate are much better than those obtained with sodium silicate.

In the present invention, the molar ratio of $M_2O:SiO_2$ is preferably comprised between 0.2 and 0.8. In the following examples, the alkali metal silicate solution contains 20 to 30 wt. % by weight of $SiO_2$, 15 to 26 wt. % of $K_2O$ or $Na_2O$, and 45 to 65 wt. % by weight of water. The solution may be prepared in advance or may result from the dissolution of solid (powdered) alkali silicate present in the mix, with added water.

Calcium Silicate as Part of or as the Aluminosilicate Component

Calcium silicates with Ca/Si atomic ratio equal to or greater than 1, such as wollastonite $Ca(SiO_3)$, gehlenite ($2CaO.Al_2O_3.SiO_2$), akermanite ($2CaO.MgO.2SiO_2$) are preferred. When the particles of these substances are exposed to an alkaline solution (NaOH or KOH), very rapid desorption of CaO occurs, so that the Ca/Si atomic ratio becomes less than 1 and is closer to 0.5. There is an in situ production of soluble calcium disilicate $Ca(H_3SiO_4)_2$ that contributes to the modified geopolymeric reaction. Industrial by-products and high-temperature residues contain essentially the basic silicates gehlenite, akermanite and wollastonite, and are thus very suitable. They are found in blast furnace slag.

Under the microscope, the hardened modified geopolymer examples of cement show that the finer slag grains have disappeared. One only sees an imprint of their initial shape, in the form of a skin probably made up of akermanite, which did not react.

This process is very regular and may be complete within 30 min. However, when the slag has a very fine grain size, such as 400 $m^2$/kg or greater (this corresponds to a mean grain size d5O of 10 μm), the hardening of modified geopolymer composite is too fast. Now, in the prior art, the blast furnace slag used has a specific surface area in the range of 400 to 600 $m^2$/kg, i.e. d5O less than 10 μm, such as in WO 98/31644.

In the Forss patents, the specific surface area of the slag is greater than 400 $m^2$/kg, preferably comprised between 500 and 800 $m^2$/kg. This is not the case in the present invention where, preferably, 5 to 15 parts by weight of blast furnace slag with a specific surface area less than 380 $m^2$/kg or d5O between 15 and 25 μm are used. This results in mixtures with a pot-life ranging between 1 and 4 hours.

In general, use of calcium silicate improves the modified geopolymer properties by better dissolution of metakaolinite in the sodium activator.

Carbon Black

The carbon black as used in modified geopolymer composite preparation according to the invention preferably has a BET surface, as measured according to ASTM 6556 standard, in the range of 5 to 1000 $m^2$/g. The following carbon blacks within this BET surface area range can be characterized:

Furnace black, in which hydrocarbons are partially combusted and immediately quenched with water. The primary particle consists of several graphene like layers, which combine to form oval or spherical particles. The processing conditions influence the particle diameter. Primary particles combine, to form aggregates of different size and structure.

Acetylene black has a special importance in electrochemical applications and is produced by partial oxidation of acetylene gas at high temperature. The acetylene black shows high aggregate structure and crystal orientation.

Pure black, which is furnace black, graphitized in a second step by a continuous graphitization process in a fluidized bed. The graphitization rearranges the graphene layers into a graphitic structure and makes them highly conductive. Moisture pick-up is very limited and solvent absorption is small.

Lamp black is a type of carbon black obtained from the soot of burned fat, oil, tar, or resin. Lamp black is a soft brownish- or bluish-black pigment that is very stable and is unaffected by light, acids and alkalis. This black, amorphous, carbon pigment is produced by the thermal decomposition of 100% natural hydrocarbons. The traditional types of lamp black are the most diverse, because lamp black was produced by collecting soot from oil lamps. The material has irregular needles, crystals, shots, and flakes of 15 to 95 nm.

It is preferred in all aspects of the invention that:

the BET surface of the carbon black is from 5 to 200 $m^2$/g, preferably from 10 to 150 $m^2$/g, in particular from 15 to 100 $m^2$/g, as measured according ISO 9477 standard.

the sulphur content of the carbon black is in the range of from 50 to 20.000 ppm, as measured according to standard ASTM D1619, preferably from 3.000 to 10.000 ppm.

the iodine number of the carbon black is from 10 to 100 mg/g, in particular from 20 to 80 mg/g, especially from 25 to 50 mg/g, as measured according to standard ISO 1304.

the oil number (OAN) of the carbon black is from 50 to 150 cc/100 g, especially 60 to 110 cc/100 g, measured according to ISO 4656.

the moisture content of the carbon black is from 0.2 to 1.5%.

the tinting strength of the carbon black is from 5 to 100%, preferably from 10 to 50% maximum, as measured according to ISO 5435.

Petroleum Cokes

Depending on purity, the conditions in the cooker and the subsequent calcinations, a variety of different coke types can be produced. Typical coke products are needle coke, regular coke, and sponge coke. Needle coke consists of highly structured graphene layers. Regular coke consists of irregularly oriented graphene layers. Sponge coke is a coke with highly porous structure. It is preferred according to the present invention to use a coke for the preparation of modified geopolymer composite having a sulphur content in the range from 1 to 100 000 ppm, preferably 50 to 20 000 ppm, as measured according to ASTM D1619, and an ash content from 0.1 to 1%. In addition, preferably, the mean diameter size of coke particles should be in the range of 0.01 to 100 μm, more preferably in the range of 0.1 to 30 μm, suitably 0.5 to 25 μm.

To obtain favourable properties of modified geopolymer composite and expanded foam composite, the coke's further properties are preferably:

an iodine number from 10 to 60 mg/g, in particular from 20 to 50 mg/g, especially from 25 to 40 mg/g, as measured according to standard ISO 1304.

an oil number (OAN) from 10 to 150 cc/100 g, especially 20 to 100 cc/100 g, more preferably from 25 to 50 cc/100 g, as measured according to standard ISO 4656.

a moisture content from 0.2 to 1.5%.

a tinting strength from 1 to 100%, preferably from 5 to 50% maximum, as measured according to standard ISO 5435.

Chamotte

The chamotte preferably used according to the invention is preferably composed of:

aluminium oxide in an amount in the range of 25 to 50 wt. %, preferably 30 to 45 wt. % and more preferably 33 to 43 wt. %.

silicon dioxide in an amount in the range of 30 to 65 wt. %, preferably 40 to 60 wt. % and more preferably 50 to 55 wt. %.

iron(III) oxide in an amount in the range of 0.1 to 4.5 wt. %, preferably 0.5 to 4.0 wt. % and more preferably 1 to 3 wt. %.

calcium oxide and magnesium oxide in a total amount in the range of 0.1 to 3 wt. %.

It is preferred that the water absorption of chamotte as used according to the invention is 10 wt. % maximum, preferably lower than 7 wt. % and more preferably lower than 5 wt. %.

Moreover, chamotte used according to the invention preferably has a melting point of approximately 1780° C. Its thermal expansion coefficient is most preferably about 5.2 mm/m, and thermal conductivity (as measured according to ISO 8301) is about 0.8 W/(m·K) at 100° C. and about 1.0 W/(m·K) at 1000° C.

The chamotte used in this invention acts as a cross-linking precursor agent.

Fumed Silica

In the present invention, the term thermal silica fume designates an amorphous type of silica obtained by condensing of SiO vapours resulting from the very high temperature electrofusion of siliceous materials, generally at about 2000° C.; the said alkaline silicate is preferably obtained by dissolving the said thermal silica in a concentrated solution of NaOH and/or KOH.

In a preferred embodiment of the invention, the thermal silica fume is prepared by electrofusion of zircon sand. The obtained thermal silica fume preferably contains at most 10% by weight of $Al_2O_3$ and at least 90% by weight of $SiO_2$. It has a chemical formula between $(13Si_2O_5, Al_2O_2)$ and $(16Si_2O_5, Al_2O_2)$, representing an aluminosilicate oxide with Al in coordination (IV), with additional amorphous silica $SiO_2$. In the following part of this specification, the aluminosilicate oxide having the characteristics of this thermal silica is written as $(15Si_2O_5, Al_2O_2)$, however, without excluding from the scope of the invention other thermal silica fumes with compositions containing at most 10% by weight of $Al_2O_3$ and at least 90% by weight of $SiO_2$.

The fumed silica used in this invention acts as a cross-linking precursor agent and viscosity modifier.

Huntite and Hydromagnesite

Huntite (magnesium calcium carbonate with the formula $Mg_3Ca(CO_3)_4$) and hydromagnesite (hydrated magnesium carbonate with the formula $Mg_5(CO_3)_4(OH)_2 \cdot 4H_2O$) or their combination in certain ratios are used according to the invention as char promoting fire retardants. Huntite and hydromagnesite in accordance with the invention preferably have the following specific properties:

- a bulk density of from 0.24 to 0.36 kg/m³.
- a particle size in the range of from 0.01 to 100 μm, as measured according to the standard procedure using a Malvern Mastersizer 2000 apparatus. The particle size is preferably in the range of from 0.1 to 30 μm, more preferably in the range of from 0.5 to 25 μm.
- a BET active surface area preferably in the range of from 5 to 30 m²/g and more preferable in the range of from 10 to 20 m²/g.
- a char residue, at 1000° C., of over 35 wt. %, preferably over 45 wt. % and more preferable over 50 wt. %.
- a specific gravity in the range of from 2.32 to 2.66 g/cm³.
- a pH in the range of from 9 to 12.
- a hardness according to the Mohs scale of minerals in the range of from 2 to 3.
- an oil absorption in the range of from 23 to 39 ml/100 g.

The expandable vinyl aromatic polymer granulate preferably comprises one or more types of modified geopolymer composite (containing encapsulated or physically or chemically modified athermanous additives selected from the group of carbon black, petroleum coke, graphitized carbon black, graphite oxides, graphite and graphene, titanium oxides, barium sulphate, ilmenite, retiles, chamotte, flay ash, fumed silica, hydromagnesite/huntite mineral, perovskite mineral).

Green Anthracite

The green anthracite is a compact variety of coal which is characterized by a low content of volatile parts, high content of carbon and large heat of combustion. Anthracite is a black or dark grey material with metalloid luster. Anthracite is formed as a result of very high temperatures and very high pressure, during diagenetic and metamorphic processes.

The green anthracite used according to the present invention preferably has a carbon content in the range of from 70 to 97 wt. %, more preferably from 92 to 95 wt. %. The ash content is in the range of from 1 to 20 wt. %, more preferably from 5 to 10 wt. %. The sulphur content is in the range of from 0.2 to 5.0 wt. %, more preferably from 0.6 to 2 wt. %. Content of volatile parts is in the range of from 1 to 15 wt. %, more preferably from 2.5 to 5 wt. %. The heat of combustion is in the range of from 20 to 30000 kJ/kg, more preferably from 30 to 29000 kJ/kg. The green anthracite has amorphous, disordered structure devoid of graphitic structures.

Gas Calcinated Anthracite

Gas calcined anthracite used according to the present invention is produced from raw anthracite by calcination in a vertical shaft furnace at a temperature in the range of from 1100 to 1300° C., which results in a very homogeneous end product.

The gas calcinated anthracite has a carbon content in the range of from 90 to 99 wt. %, more preferably from 95 to 99 wt. %. The ash content is in the range of from 1 to 20 wt. %, more preferably from 3 to 7 wt. %. The sulphur content is in the range of from 0.1 to 1.5 wt. %, more preferably from 0.2 to 1.0 wt. %. In the calcination process irregular carbon structures, or carbon based molecules become more ordered carbon layers and exhibit graphitic structures.

Electrically Calcined Anthracite

Electrically calcined anthracite is a carbonaceous material manufactured by heat treating high grade anthracite coal in an electrically "fired" calcining furnace. Anthracite is heated to temperatures of in the range of from 1900 to 2200° C., which results in some development of a graphitic structure in product.

Electrically calcined anthracite has a carbon content in the range of from 90 to 99 wt. %, more preferably from 95 to 99 wt. %. The ash content is in the range of from 1 to 20 wt. %, more preferably from 3 to 8 wt. %.

The sulphur content is in the range of from 0.1 to 1.5 wt. %, more preferably from 0.2 to 0.8 wt. %. Content of volatile parts is in the range of from 0.5 to 5.0 wt. %, more preferably from 1 to 3 wt. %. In the calcination process, irregular carbon structures, or carbon based molecules, become more ordered carbon layers and exhibit graphitic structures.

Ammonium Polyphosphate

Ammonium polyphosphate is an inorganic salt of polyphosphoric acid and ammonia. The chain length (n) of this polymeric compound is both variable and branched, and can be greater than 1000.

In the solid state the powder of APP can have a form with an average particle size (D50) in a range of 1 to 30 μm.

Short and linear chain APP (n<100) are water sensitive (hydrolysis). Short and linear chain APP will begin to decompose at temperatures above 150° C.

Long chain APP with an "n" value higher than 1000 starts to decompose at temperatures above 300° C. to polyphosphoric acid and ammonia. Its crosslinked/branched structure shows a very low water solubility (<0.1 g/100 ml).

APP is mainly used in polyolefin (PE, PP), thermoset resins such as epoxy resins, polyurethane, unsaturated polyester phenolic resins and others. APP is an non-toxic, environmentally friendly material and it does not generate additional quantities of smoke. The synergistic effect of modified geopolymer and APP, modified geopolymer composites and APP and geopolymer modified APP on improved self-extinguishing properties of expanded vinyl aromatic polymer foam was found in accordance with the present invention.

Preferably, the parameters, features and preferred embodiments relating to the a. modified geopolymer or b. modified geopolymer with carbon athermanous additive or c. modified geopolymer composite, and furthermore the use of vinyl aromatic copolymers with p-tert-butylstyrene as example or other vinyl aromatic comonomers, set out above in relation to the processes of the invention, equally apply to the expandable vinyl aromatic polymer granulate and the other aspects; the same applies for the other constituents, of the modified geopolymer composite, the granulate, the foam, and the masterbatch.

It is most preferred that the modified geopolymer or geopolymer composite comprises a certain amount of water, preferably from 0.5 to 20 wt %, more preferably from 1 to 15 wt %, in particular from 2 to 10 wt %.

III) Use of i) the Modified Geopolymer, of ii) the Combination of a Modified Geopolymer with an Additive and of iii) the Modified Geopolymer Composite in Polymer Foam In a third aspect, the invention relates to the use of
1. a modified geopolymer derived from geopolymer and modified with one or more compounds selected from phosphorus compounds, nitrogen compounds, copper compounds, silver compounds, zinc compounds, tin compounds, and magnesium compounds;
2. a combination of i) a modified geopolymer derived from geopolymer and modified with one or more compounds selected from phosphorus compounds, nitrogen compounds, copper compounds, silver compounds, zinc compounds, tin compounds, and magnesium compounds, with ii) an additive; or
3. a modified geopolymer composite derived from geopolymer, modified with one or more compounds selected from phosphorus compounds, nitrogen compounds, copper compounds, silver compounds, zinc compounds, tin compounds, and magnesium compounds, the modified geopolymer composite further comprising additive, for decreasing the thermal conductivity of a foam comprising polymer (the decrease being measured according to ISO 8301). The polymer may be a polyolefin, such as derived from ethylene, propylene, or mixtures thereof. Alternatively, and preferably, the polymer may be vinyl aromatic polymer.

In one embodiment, a), the modified geopolymer is used.

In a second embodiment, b), a modified geopolymer is used in combination with an additive. In this embodiment, the modified geopolymer and the additive can be added separately, to result in the filled vinyl polymer foam. Alternatively, modified geopolymer (powder) and additive (powder) are first mixed, and are then added, as the mixture of modified geopolymer and additive, to result in the filled polymer foam.

In a third embodiment, c), the modified geopolymer composite as described above is used, i.e. the novel material wherein the (preferably athermanous) additive is comprised within the modified geopolymer, and is preferably actually encapsulated by the geopolymer.

IV) Process for the Production of Expandable Vinyl Aromatic Polymer Granulate in an Extrusion or a Suspension Process The invention further in a fourth aspect relates to a process for the production of expandable vinyl aromatic polymer granulate by an extrusion or a suspension process, the process comprising the addition of a. a modified geopolymer derived from geopolymer and modified with one or more compounds selected from phosphorus compounds, nitrogen compounds, copper compounds, silver compounds, zinc compounds, tin compounds, and magnesium compounds;
b. a combination of i) a modified geopolymer derived from geopolymer and modified with one or more compounds selected from phosphorus compounds, nitrogen compounds, copper compounds, silver compounds, zinc compounds, tin compounds, and magnesium compounds, with ii) an additive; or
c. a modified geopolymer composite derived from geopolymer, modified with one or more compounds selected from phosphorus compounds, nitrogen compounds, copper compounds, silver compounds, zinc compounds, tin compounds, and magnesium compounds, the modified geopolymer composite further comprising additive.

In the fourth aspect, the present invention thus relates to IV) a process for the production of expandable vinyl aromatic polymer in the form of granulate of so-called expandable particles (micro-pellets or beads). There are two embodiments of this process involving the addition of a) a modified geopolymer, b) a combination of a modified geopolymer with an additive, or c) the modified geopolymer composite, namely (1) an extrusion process (XEPS) and (2) a suspension polymerization process (EPS). In both types of processes, incorporation of a new type of additive (a., b., or c. above) favourably contributes to both the process conditions and the properties of the product.

In the first embodiment of this aspect, the invention relates to an extrusion process for the production of expandable vinyl aromatic polymers, preferably by twin-screw extrusion consisting of a two-step mixing of the additive and flame retardant in two twin-screw extruders. Mixing takes place in a side twin screw extruder to which the additive (modified geopolymer, or combination of modified geopolymer with additive or mixture of additives, or modified geopolymer composite) is added through the two side feeders, in order to better degas the melt from excess of water and air. In this way, a filler masterbatch is created "in situ" and the filled melt is then (preferably directly, i.e. as melt) transferred to the main 32D twin-screw extruder.

The main extruder is filled with general purpose polystyrene (the same as the one dosed to the side twin screw extruder), polymeric brominated flame retardant, synergist of flame retardant (a type of initiator or peroxide) and nucleating agent (a type of polyethylene wax, or one with 80% crystallinity obtained in a Fischer-Tropsch production process). Then, the melt is impregnated with blowing agent (propellant, typically pentanes, or a suitable mixture). The melt containing all additives is then cooled in a single screw extruder. The melt is then downstream processed in a pressurized underwater pelletization process, to obtain vinyl aromatic polymer granulate. The granulate is finally coated with a mixture of zinc (or magnesium) stearate, glycerine monostearate and glycerine tristearate. If a brominated flame retardant is used, the modified geopolymer or modified geopolymer composite preferably has a low alkali content.

According to the first embodiment of aspect (IV), expandable vinyl aromatic polymer granulate is preferably prepared in an extrusion process as shown in detail in WO2016/113321 A1.

The use of a brominated flame retardant can in accordance with the invention be reduced or even be dispensed with, for instance if the modified geopolymer or modified geopolymer composite incorporates polyphosphate flame retardant. Especially if no brominated flame retardant is used, the modified geopolymer or modified geopolymer composite of the present invention need not have a low alkali content.

In the second embodiment of the fourth aspect of the invention, expandable vinyl aromatic polymer is prepared in a suspension polymerization process.

In the first step of a preferred suspension process, radically initiated copolymerization preferably takes place in the presence of powder of a. modified geopolymer, or b. combination of modified geopolymer with additive, or c. modified geopolymer composite, each preferably hydrophobized on the surface by the coupling agents, in particularly by vinyl silanes. In the next step, mixing of prepolymer as obtained in first step with vinyl aromatic polymer takes place, preferably in a twin-screw co-rotating extruder. Underwater pelletization gives a masterbatch in the form of granulate. Then, this masterbatch is preferably, dissolved in styrene, together with flame retardant and nucleating agent. Water is then added, followed by peroxide and surfactants. The polymerization is continued at a temperature in a range of from 75 to 130° C. Next, the resultant polymer is centrifuged to remove the water from the polymer particles (granulate), the particles are dried and are finally coated with a mixture of magnesium (or zinc) stearate and/or mono- and/or di- and/or tristearate of glycerine.

The suspension process preferably comprises the steps as described in more detail in WO2016/113321 A1.

V) Composition Comprising Polymer and i) Modified Geopolymer, ii) the Combination of a Modified Geopolymer with an Additive, or iii) a Modified Geopolymer Composite In a fifth aspect, the invention relates to a composition comprising one or more polymers, the composition further comprising a. a modified geopolymer derived from geopolymer and modified with one or more compounds selected from phosphorus compounds, nitrogen compounds, copper compounds, silver compounds, zinc compounds, tin compounds, and magnesium compounds;

b. a combination of i) a modified geopolymer derived from geopolymer and modified with one or more compounds selected from phosphorus compounds, nitrogen compounds, copper compounds, silver compounds, zinc compounds, tin compounds, and magnesium compounds, with ii) an additive; or c. a modified geopolymer composite derived from geopolymer, modified with one or more compounds selected from phosphorus compounds, nitrogen compounds, copper compounds, silver compounds, zinc compounds, tin compounds, and magnesium compounds, the modified geopolymer composite further comprising additive.

Preferably, the polymer that is used together with the modified geopolymer or the modified geopolymer composite is selected from vinyl polymer, polyurethane, polyolefin, polycarbonate, polyester, polyamide, polyimide, silicone and polyether. More preferably, the polymer is selected from vinyl aromatic polymer, polyethylene and polypropylene, most preferably the vinyl aromatic polymer is polystyrene.

The composition can be in the form of expandable vinyl aromatic polymer granulate, in the form of expanded vinyl polymer foam, or in the form of a masterbatch.

Further preferred is expandable vinyl aromatic polymer granulate, and an expanded foam products made thereof, which comprises vinyl aromatic polymer prepared from styrene monomer with optional incorporation of one or more vinyl comonomers, and a) 0.01-50 wt. % (by polymer weight, including solid and, if any, liquid additives, but exclusive of propellant) of modified geopolymer in powder form, with a particle size from 0.01 µm to 200 µm, measured using a Malvern Mastersizer apparatus according to ISO 13320-1, and a BET surface in the range from 0.01 to 10000 m$^2$/g, measured using a Gemini 2360 surface area analyzer from Micromeritics according to ISO 9277:2010, b) 0.01-50 wt. % (by polymer weight, including solid and, if any, liquid additives, but exclusive of propellant) of a combination of modified geopolymer with carbon blacks or mixture of at least two types of carbon blacks. The ratio of modified geopolymer to carbon black or mixtures of at least two carbon blacks is typically in a range of from 1/100 to 100/1. The weight ratio of first carbon black to the second, third or fourth carbon black is typically in the range of from 1/100 to 100/1; with the same ratio a mixture of second to third or third to fourth carbon black is possible. A maximum of 10 different carbon blacks could be used, in a respective ratio in the range of from 1/100 to 100/1, and/or c) 0.01-50 wt. % (by polymer weight, including solid and, if any, liquid additives, but exclusive of propellant) of modified geopolymer composite in powder form, with a particle size in a range of from 0.01 µm to 200 µm, measured using a Malvern Mastersizer apparatus according to ISO 13320-1, and a BET surface in a range of from 0.01 to 10,000 m$^2$/g, measured using a Gemini 2360 surface area analyzer from Micromeritics according to ISO 9277:2010.

Expandable vinyl aromatic polymer granulate may be expanded to form foam with a uniform structure independently from the concentration of modified geopolymer or modified geopolymer composite in the foam. A uniform structure is characterized by the cell size distribution, as measured by a statistical analysis of the picture prepared by an optical microscopy measurement.

Preferably, and according to the fifth aspect, the invention relates to the expandable vinyl aromatic polymer granulate (particles) as obtainable according to the fourth aspect, preferably in an extrusion or a suspension processes.

The expandable vinyl aromatic polymer granulate comprises polymer, one or more propellants and additive which is a. modified geopolymer, or b. a combination of a modified geopolymer with an additive, but is preferably c. the modified geopolymer composite as prepared from modified geopolymer and suitable additive such as those from the group of carbon based athermanous additives, with optional addition of modified geopolymeric binders and minerals. The binders and/or minerals and/or carbon-based athermanous additives can be used alone in the b. combination of modified geopolymer or be used separately according to the desired properties of modified geopolymer composite and final (foamed) product.

Additionally, the granulate or foam may contain: brominated flame retardant, preferably an environmentally friendly polymeric brominated flame retardant (Emerald 3000 from Chemtura, FR-122P from ICL or GREENCREST from Albemarle); synergist from the group of initiators or peroxides with relatively high temperature of decomposition; nucleating agent with high degree or crystallinity, preferably polyethylene oligomers from the group of Polywax (Baker Hughes) or Fischer Tropsch waxes from Evonik for example; blowing agent from the group of low boiling hydrocarbons, such as pentane or its suitable mixtures with isopentane.

The vinyl aromatic polymer used in all aspects of the invention is in particular polystyrene or a vinyl aromatic styrene copolymer. In the copolymer, a part of styrene monomer is substituted with unsaturated comonomers, the reactivity of which is close to styrene monomer's reactivity, such as p-methyl styrene and its dimers, vinyl toluene, t-butyl styrene or divinylbenzene. For the extrusion process and suspension process, typically used vinyl aromatic polymers have a different number average molecular weight.

In the extrusion process, it is preferred to use a general purpose type of polystyrene (or a copolymer with unsaturated styrene derivative) with a number average molecular weight (Mn) of from 40 to 100 kg/mol, preferably of from 50 to 80 kg/mol, more preferably of from 55 to 70 kg/mol, and a suitable polydispersity of Mw/Mn in a range of from 2.0 to 5.0, preferably of from 2.5 to 4.0, more preferably of from 3.0 to 3.5, and Mz/Mw in the range of from 1.5 to 2.5.

The vinyl aromatic polymer as produced in the suspension process preferably has a number average molecular weight (Mn) from 50 to 120 kg/mol, preferably of from 60 to 100 kg/mol, more preferably of from 70 to 90 kg/mol, and a suitable polydispersity Mw/Mz in a range of from 2.0 to 4.5, preferably from 2.5 to 4.0, more preferably from 3.0 to 4.0, and Mz/Mw in the range of from 1.5 to 2.5.

Flame Retardant and Flame Retardant System

Typically, a flame retardant is used according to all aspects of the invention, to make expanded vinyl aromatic polymers which are self-extinguishing. The flame retardant is usually a combination of two types of compounds, namely a brominated aliphatic, cycloaliphatic, aromatic or polymeric compound containing at least 50 wt. % of bromine, and a second compound (so called synergistic compound) which can be bicumyl (i.e. 2,3-dimethyl-2,3-diphenylbutane) and/or its polymeric form, or 2-hydroperoxy-2-methylpropane.

Alternatively, a phosphorus flame retardant or a nitrogen flame retardant or a phosphorus/nitrogen flame retardant can be used, as set out above.

Optionally, the flame retardant can be stabilized by addition of thermo-oxidative stabilizers, especially standard components (e.g. Irganox 1010 in synergistic mixture with Irgafos 126), in which the components are used in a ratio of 1/2, preferably 1/1. The bromic acid scavenger used can be an epoxy resin, e.g. a solid multifunctional epichloro-hydrin/cresol novolak epoxy resin, for example Epon 164 with an epoxy equivalent weight of 200 to 240 g/eq. The resin is typically used in a ratio of 2/1 with Irganox 1010 and Irgafos 126.

Other acid scavengers that can be used are special grades of hydrotalcite such as DHT-4A from Kisuma Chemicals and hydromagnesite/huntite mineral, a hydrated magnesium carbonate mixed with platy magnesium calcium carbonate (such as UltraCarb 1250 from Minelco). Additionally, hydro-magnesite/huntite can act as halogen free flame retardant and smoke suppressant and can thus in combination with brominated flame retardant strengthen the self-extinguishing effect. A beneficial influence of this mineral in the reduction of thermal conductivity was also noticed.

A process for the production of expanded vinyl aromatic polymer foam preferably comprises the following steps:
i) the first step is preferably preliminary expansion, recognized by the industry as the first step of expansion, to obtain a required density of approx. 17 kg/m$^3$, before the second expansion step to obtain an even lower density, for example approximately 11 or 12 kg/m$^3$. Obviously, the first expansion step can be only used to obtain expanded beads ready for block moulding process. Steam pressures in the range of from 0.02 to 0.22 kPa are used. The steaming time can vary from 30 to 100 seconds.

ii) In the next step, the expanded beads are aged, and this is necessary after the first and as well after the second expansion process. Aging is preceded in the silos made of breathable material. Usually, a minimum of 6 h is necessary to achieve good properties of final material and optimum moulding conditions. Maximum 24 h can be utilized preferably. Aging serves to stabilize the content of blowing agent in the beads by interchange its part by the air. This process also equalizes the pressure of gases in the cells.

iii) In the second step, the block moulding process proceeds and the expanded beads are welded together to form the bead foam block. Depending on the foam density and foam type, the steam pressure varies from 0.4 to 0.9 kPa. With this material, all possible foam densities required for the EPS market can be obtained, from 8 to 30 kg/m$^3$.

iv) Then the moulded blocks are conditioned for several days, to remove the rest of blowing agent and water, and to stabilize their shape. After that time, the blocks can be cut, to the final foam insulation boards.

The composition according to the fifth aspect can be in the form of expanded vinyl polymer foam, the foam having
a density of from 8 to 30 kg/m$^3$, and
a thermal conductivity (as measured according to ISO 8301) of from 25 to 35 mW/K·m.

The vinyl polymer is preferably vinyl aromatic polymer, and the foam is preferably obtainable by expansion of the granulate.

In a preferred embodiment, the composition is in the form of a masterbatch comprising vinyl polymer, and
a. the amount of modified geopolymer is in a range of from 10 to 70 wt. %, based on the weight of the masterbatch;
b. the total amount of i) modified geopolymer and ii) additive is in a range of from 10 to 70 wt. %, based on the weight of the masterbatch; or
c. the amount of modified geopolymer composite is in a range of from 10 to 70 wt. %, based on the weight of the masterbatch.

Preferably, the amount as per a., b., or c. is in a range of from 10 to 65 wt. %, based on the weight of the masterbatch, more preferably the amount is in a range of from 20 to 60 wt. %, in particular the amount is in a range of from 25 to 55 wt. %.

Preferably, the vinyl polymer of the masterbatch is a vinyl aromatic polymer, more preferably the vinyl aromatic polymer has a melt index in a range of from 4 to 30 g/10 min, as measured according to ISO 1133, in particular the vinyl aromatic polymer is a homopolymer or copolymer with p-tert butyl styrene or alpha-methyl styrene.

In a preferred embodiment, the masterbatch further comprises one or more silanes. Preferably, the amount of silane is in a range of from 0.01 to 1 wt. %, based on the respective weight of a., b. or c. in the masterbatch.

The foam (made of expanded vinyl aromatic polymer with addition of a. modified geopolymer, or b. combination of modified geopolymer with additive, or c. modified geopolymer composite) has a density of from 8 to 30 kg/m$^3$, and a thermal conductivity (as measured according to ISO 8301) of from 25 to mW/K·m. Specifically, the foam should have thermal conductivity for low densities in the range of from 31 to 34 mW/m·K at densities of from 8 to 14 kg/m$^3$. For higher densities, thermal conductivity is preferably in the range of from 28 to 31 mW/mK, at densities of from 17 to 21 kg/m$^3$.

In all aspects of the invention, when c. modified geopolymer composite is present, this does not exclude the presence of additive that is not contained within the modified geopolymer composite.

The materials according to the invention (the polymer composition, the granulate, the foam and the masterbatch) may, in addition to a. a modified geopolymer;

b. a combination of a modified geopolymer with an additive; or c. the modified geopolymer composite, contain further additives, as is set out above.

It is noted that, unlike the properties of the starting materials, the properties of additives as contained in the granulate or foam are notoriously difficult to determine. It is often considered more appropriate to characterize the additives in granulate and foam with reference to the properties of the additives as initially used.

It is further noted that, whenever reference is made in the description to an "additive", this is in all embodiments and aspects of the invention preferably a reference to an "athermanous additive", as athermanous additives are most preferred additives The advantages of the present invention become apparent from the following examples. Unless indicated otherwise, all percentages are given by weight.

Moreover, whenever reference is made in the description to an amount of any additive "by weight of polymer", this refers to the amount of the additive by weight of polymer component inclusive of (solid and, if any, liquid) additives, but exclusive of propellant.

EXAMPLES

The following examples show a process for geopolymer or geopolymer composite preparation, including modification options. Further, these examples show the influence of this modification for the vinyl aromatic polymer foam's properties.

The following geopolymers were prepared with below described process (Tables 1.1 and 1.2).

TABLE 1.1

Geopolymer composites

| | No. | | | | |
|---|---|---|---|---|---|
| | 1 | 2 | 3 | 4 | 5 |
| Silanes (wt. %) | – | – | – | – | 1 |
| Butadiene-styrene latex (wt. %) | – | – | – | – | 10 |
| Geopolymer matrix (wt. %) | 50 | 50 | 50 | 50 | 50 |
| Ranco 9895 (wt. %) | 50 | 50 | 50 | 25 | 50 |
| Gas calcined anthracite (%.wt) | – | – | – | 12.5 | – |
| Metallurgical coke (wt. %) | – | – | – | 12.5 | – |
| Phosphoric acid (wt. %) | – | – | – | – | – |
| Ammonium polyphosphate (wt. %) | – | – | – | – | – |
| Sodium (wt. %) | 0.5 | 0.2 | 0.05 | 0.04 | 0.06 |
| $1^{st}$ filtration | + | + | + | + | + |
| Process water cake washing | + | + | + | + | + |
| Repulpation in acid solution (0.01%) | – | – | + | – | – |
| Repulpation in acid solution (0.1%) | – | + | – | + | + |
| $2^{nd}$ filtration | – | + | + | + | + |
| Demineralized water cake washing | + | + | + | + | + |

TABLE 1.2

Geopolymer composites

| | No. | | | | |
|---|---|---|---|---|---|
| | 6 | 7 | 8 | 9 | 10 |
| Silanes (wt. %) | – | – | – | – | – |
| Butadiene-styrene latex (wt. %) | – | – | – | – | – |
| Geopolymer matrix (wt. %) | 47.5 | 45 | 47.5 | 47.5 | 47.5 |
| Ranco 9895 (wt. %) | 47.5 | 45 | 47.5 | 47.5 | 47.5 |
| Gas calcined anthracite (%.wt) | – | – | – | – | – |
| Metallurgical coke (wt. %) | – | – | – | – | – |
| Phosphoric acid (wt. %) | 5 | 10 | – | – | – |
| Ammonium polyphosphate (wt. %) | – | – | 5 | 5 | – |
| Sodium (wt. %) | 0.04 | <0.02 | 0.05 | 0.03 | 0.03 |
| Copper (wt. %) | – | – | – | – | 5 |
| $1^{st}$ filtration | + | + | + | + | + |
| Process water cake washing | + | + | + | + | + |
| Repulpation in HCl acid solution (0.01%) | – | – | – | – | – |
| Repulpation in HCl acid solution (0.1%) | + | + | + | – | + |
| Repulpation in APP solution(7%) | – | – | – | + | – |
| $2^{nd}$ filtration | + | + | + | + | + |
| Demineralized water cake washing | + | + | + | + | + |
| $H_3PO_4$ introduced via washing | + | + | – | – | – |
| APP introduced via washing | – | – | + | – | – |
| $CuCl_2$ introduced via washing | – | – | – | – | + |

Geopolymer Composite Preparation

The components: 39.6 kg of a powder mixture comprising 19.8 kg of metakaolinite from Česke Lupkové Závody, a.s., Czech Republic and 19.8 kg of furnace slag from ironworks Katowice, Poland and 31.7 kg of sodium water glass with a molar module of 1.82 from Rudniki, Poland were charged into a high speed screw conical mixer having a volume of 0.2 m$^3$ and mixed over 1 min. with a speed of 300 rpm, to obtain a thixotropic sol-gel. Then, the carbon additive, namely petroleum coke (Ranco 9895 from Richard Anton KG having a mean diameter particle size of 3 μm, a BET surface area of 28.5 m$^2$/g and total surface area of pores 12.1 m$^2$/g, 0.006-0.01 μm pores size content of 0.04% and a sulphur content of 10100 ppm) was added in an amount of 52 kg, and 46.8 l of water was added subsequently to the gel and mixed during the next 1 min, also with a high speed of 300 rpm. After that, the viscous, homogenous gel was discharged from the mixer directly do an open mould made of polished stainless steel (total amount of 170 kg). The mould was then closed and left for 24 h to perform geopolymerization. After 24 hours, the mould was opened and transported to the drier to perform drying process for 8 h at a temperature of 70° C., and 16 h at a temperature of 120° C. Under these conditions, the geopolymer composite was dried over 24 h, and approx. 29 wt. % of water excess was evaporated from the material. Still approx. 10% of water remain in the material.

The dried geopolymer composite block was then placed into a crusher to obtain the granulate. The granulate with an average particles size of 10 mm was jet milled with the use of hot air as milling medium, to obtain free flowing powder.

The fine powder, containing of about 3 wt. % of water (amount of approx. 107 kg), was then placed in a 0.6 m$^3$ in heated dissolver (reactor), equipped with a high speed agitator and ribbon stirrer turning closely to the dissolver walls. Immediately thereafter, 214 l of filtrated process water were charged into the dissolver and mixing was started simultaneously. An amount of 46.2 kg of concentrated aqueous hydrochloric acid (30%) was then added to reactor over 5 min and dealkalization was performed. The starting pH, as measured before acid addition, was 13, after 60 min.

of mixing and dealkalization the final pH was 7.5. The water (filtrate) with a conductivity of about 80,000 µS/cm was filtrated from the powder of geopolymer composite and the precipitate was obtained, containing approx. 50 wt. % of water. Then, a portion of process water was used to wash remaining sodium chloride and other chlorides from the precipitate. Washing was continued for 20 min, to obtain a filtrate having a conductivity below 400 µS/cm. After that, a membrane squeeze of about 16 bar was applied, to increase the solids content to wt. %. The precipitate was removed from the press, granulated and loaded to a repulpation dissolver with the same mixing system as for the dealkalization reactor. Further salts elution in a diluted solution of hydrochloric acid (0.1%) and deionized water was performed. Following repulpation, the slurry was filtrated and washed for about 20 min, to obtain a filtrate having a conductivity below 100 µS/cm.

Optionally, and to further improve self-extinguishing of vinyl aromatic foams with the use of geopolymeric composite, 3 wt. % of a solution of phosphoric acid (preferably 75% concentrated) in demineralized water was pumped through the filter press, to modify the surface of geopolymer or geopolymer composite. A precipitate with a water content of about 45 wt. % was then finally vacuum dried over 4 h at a temperature of 120° C. and a pressure level of about 0.2 mbar. The dry precipitate, containing of about 10% of water and 5 wt. % of phosphoric acid in its structure, was then granulated and deagglomerated in an impact mill, to result in a fine powder with a D50 of about 2.7 µm as presented on the accompanying FIGURE. The 5 wt. % content of phosphoric acid was analysed in the geopolymeric additive. The content of analysed sodium was 500 ppm.

To improve the adhesion of petroleum coke or other carbon based filler to the geopolymer, 1 wt. % of aminopropyltriethoxysilane or phenyltriethoxysilane was added to the mixture of metakaolinite and furnace slug (1 wt. % of silane per amount of mixture) before addition of sodium glass water, and mixed for 1 min. in a conical mixer. It is possible that special equipment for silanization of powders can be used, for example a twin-cone blender or a vacuum tumble dryer, or it could be performed earlier in the solvent conditions, in toluene for example. Alternatively, functionalization with silane of geopolymer can be performed during mixing of the gel.

To further improve adhesion and thus dispersion of the geopolymer composite powder in the expandable vinyl aromatic polymer as obtained by the extrusion process, one can perform silanization of the final powder. Phenyltriethoxysilane can be used for this purpose, in a concentration of 1 wt. % calculated per geopolymer composite powder amount.

Finally, to further reduce the thermal conductivity coefficient (lambda) and to thus improve the insulating properties of vinyl aromatic polymer foams according to the present invention, the geopolymeric composite can be modified with 7 wt. % solution of copper (II) chloride via ion exchange. This could be done in the repulpation stage or after salts washing by demineralized water in the filter press. In that case, the $CuCl_2$ solution is pumped through the press with a pressure of about 5 bar in the closed loop, preferably ten times the mass of the solution must flow through the press. After this, vacuum drying is performed as described already. Obtained geopolymer powder usually contain approx. 5 wt. % of copper in the structure.

At the end the final powder with an average particles size (D50) of 2.7 µm, containing D90=5.9 µm, D99=10.1 µm (the accompanying FIGURE), BET 31.2 m²/g and total surface area of pores 15.9 m²/g, 0.006-0.01 µm pores size content of 0.33%. The pore size of about 5 to 100 nm was increased of about 88%. The table below shows the difference is pore content of different size for obtained geopolymer composite particle and unmodified petroleum coke (Ranco 9895) particle (before modification via geopolymer), which examples that homogenous new type of particle was obtained. The mesoporosity was significantly increased, as shown below (Table 1.3):

TABLE 1.3

| Parameter | Unit | Ranco 9895 | Geopolymer composite 3 |
|---|---|---|---|
| Porosity | % | 34.02 | 40.36 |
| 0.5-1 µm | % | 19.68 | 21.43 |
| 0.25-0.5 µm | % | 59.36 | 53.62 |
| 0.1-0.25 µm | % | 15.42 | 16.11 |
| 0.05-0.1 µm | % | 3.52 | 4.90 |
| 0.025-0.05 µm | % | 1.27 | 2.16 |
| 0.01-0.025 µm | % | 0.71 | 1.44 |
| 0.006-0.01 µm | % | 0.04 | 0.33 |
| SUM | % | 100.00 | 100.00 |

From all performed analyses of the quality of obtained geopolymers or geopolimer composites the sodium content is presented as the most important, from an improved process point of view. Later it could be seen how sodium content and phosphorus compound content influence the foam self-extinguishing properties and to which content in the foam brominated flame retardant could be reduced.

1. Sodium Analysis Description

A crucible with 0.05 g dried sample is placed in the oven for 5 h at 500° C. for burning. The ash after burning is cooled down, in the next step ca. 10 ml deionized water with 1 ml HCl (35-38%) is added to the crucible with sample, and the content is heated using a laboratory hotplate at 140° C. for 30 min. The sample is cooled down and transferred through the filter (cleaned beforehand for a minimum of 3 times using deionized water) into the 100 ml flask, in the next step 8 ml 1 M nitric acid with 4 ml spectral buffer of cesium chloride (2.5% Cs) is added. Simultaneously with the sample for analysis one control (blank) sample is prepared using the same procedure and the same reagents.

The sample solution as prepared applying the procedure described above is measured by Atomic Absorption Spectrometer, using a device AA iCE 3500 GFS35Z, and following parameters: working mode: absorption, wave length: 589.0 nm, gap: 0.2 nm, The presented analytical procedure is based on the standard defining Na analysis PN-ISO 9964-1:1994+Ap1:2009, sample preparation for measurement is based on internal procedure standard 61/A issue 3 dated 30 Apr. 2009.

2. Phosphorus and Copper Content

The content of $H_3PO_4$ and ammonium polyphosphate and the metal content were concluded from x-ray spectroscopy (XRF), by measuring the content of phosphorus or metal, calculated as content of $P_2O_5$ or metal oxide. XRF was performed with the use of a vessel for powders and oils analysis on the Prolen foil with thickness of 4 µm. A WD-XRF model S8 Tiger apparatus from Bruker was used to perform analysis.

3. Specific Surface Area

The specific surface area was determined using a Gemini 2360 (Micromeritics) device. The measurement minimum of the Gemini 2360 apparatus for specific surface was from 0.01 m²/g, the total surface range was from 0.1 to 300 m², and the pore size starting from $4.10^{-6}$ cm/g. Analysis was performed in a range P/P₀ from 0.05 to 0.3. Degasification of sample was made in an inert gas atmosphere of nitrogen (with flow of 50 cm³/min.). Later, the sample was dried over 2 h at a temperature of 110° C. Nitrogen was used as measurement gas.

4. Mercury Porosimetry

The pore size of the samples was measured using a Autopore IV 9500 device according to an internal standard. Mercury contact angle is 130°. Before the measurement, each sample was conditioned for 2 h at 200° C.

Expandable Vinyl Aromatic Polymer Preparation

A mixture of vinyl aromatic polymer in the form of granules, containing 0.5 wt. % of Emerald 3000, 0.1 wt. % of bicumyl and 0.15 wt. % of nucleating agent (Polywax 2000), was dosed to the main hopper of the main 32D/40 mm twin-screw co-rotating extruder. The melt temperature in the main extruder was 180° C.

The geopolymer composite powder as prepared in EXAMPLE 1 was dosed in a concentration of 10 wt. % (per foam composition) to the side arm (54D/25 mm) twin-screw co-rotating extruder via two side feeders, and the vinyl aromatic polymer (in the form of granules) was dosed to the main hopper of this extruder. The melt, containing 30 wt. % of concentrated geopolymer additive, was transported to the main extruder. The melt temperature inside the extruder was 190° C.

The blowing agent (n-pentane/isopentane mixture 80/20%) was injected to the main 32D/40 mm extruder, downstream from the injection of the melt from the side twin-screw extruder. The concentration of blowing agent was 5.5 wt. %, calculated on total mass of product.

The melt of vinyl aromatic polymer containing Emerald 3000 flame retardant, bicumyl, nucleating agent, geopolymer composite and blowing agent was transported to the 30D/90 mm cooling extruder and pumped through a 60 mm length static mixer, melt pump, screen changer, diverter valve, and extruded through the die head with 0.75 mm diameter holes, and underwater pelletized by the rotating knifes. Downstream, the rounded product, a granulate with a particle size distribution of 99.9% of the fraction 0.8-1.6 mm was centrifuged to remove the water, and was finally coated by the suitable mixture of magnesium stearate with glycerine monostearate and tristearate. The melt temperature in the cooling extruder was 170° C.

The coated beads were expanded, to measure the final general properties of expanded foam composite:
1. Thermal conductivity according to standard ISO 8301.
2. Mechanical properties (compressive and bending strength) according to standard EN 13163.
3. Flammability according to tests methods: EN ISO 11925-2 and DIN 4102 B2.
4. Dimensional stability under specified temperature and humidity conditions of expanded foam were determined according to standard PN-EN 1604+AC, which is normally used for XPS materials.

The expandable granulate with a particle size distribution 0.8 to 1.6 mm was in the pre-expander vessel treated for 50 sec. with steam having a pressure of 0.2 kPa, and was then dried in a connected fluid bed drier. The obtained beads' density was 15 kg/m³. Then the expanded beads were conditioned in a silo for 24 h and introduced to the block mould with dimensions of 1000×1000×500 mm. Steam having a pressure of 0.7 kPa was used to weld the beads, and to obtain moulded blocks having a density of 15.5 kg/m³. The mould cooling time in this case was 70 sec. The ready block was cut into plates and then specimens after 6 days of conditioning at room temperature.

Example 1 (Geopolymer Composite 1 Used)

This example shows the use of geopolymer composite as prepared according to the process of WO2016/113321 A1, without use of a repulpation step and a second step of filtration, to show the importance of the improvement of the process for geopolymer or geopolymer composite production according to the present invention (see Example 1 below, Table 1.1). In this example, foam containing 1.5 wt % of Emerald 3000 was produced. The self-extinguishing properties as presented in Table 2 were obtained.

Example 2 (Geopolymer Composite 1 Used)

This example presents the properties of exactly the same material as in Example 1, but a foam with addition of 1.0 wt. % of Emerald 3000 was obtained. The self-extinguishing properties were obtained as presented in Table 3. With the reduction of the concentration of the flame retardant Emerald 3000, the self-extinguishing is worse than in Example 1.

Example 3 (Geopolymer Composite 1 Used)

This example present properties of exactly the same material as in Example 2, but a foam with addition of 0.75 wt. % of Emerald 3000 was obtained. The self-extinguishing properties were obtained as presented in Table 4. With the reduction of Emerald 3000 concentration, the self-extinguishing is even worse than in Example 2.

Example 4 (Geopolymer Composite 2 Used)

This example presents the advantage when the geopolymer composite 2 with a reduced content of sodium was used to prepare the EPS foam. In this case, the same concentration of Emerald 3000 was used as in Example 3 (0.75 wt. %). The self-extinguishing properties were obtained as presented in Table 5. With the reduction of the sodium concentration, the self-extinguishing at the same content of Emerald 3000 was improved.

Example 5 (Geopolymer Composite 2 Used)

This example is comparable to Example 4, but in this case the Emerald 3000 concentration was reduced to 0.5 wt. %. The self-extinguishing properties were obtained as presented in Table 6. With the reduction of Emerald 3000 concentration and without changing sodium concentration, the self-extinguishing is worse.

Example 6 (Geopolymer Composite 3 Used)

This example is comparable with Example 5. The same content of Emerald 3000 was used (0.5 wt %), but the sodium content was reduced by increasing the concentration of hydrochloric acid solution in the repulpation process. The self-extinguishing properties were obtained as presented in Table 7. With the reduction of sodium concentration, the self-extinguishing at the same content of Emerald 3000 was improved.

Example 7 (Geopolymer Composite 4 Used)

This example is comparable with Example 6, with the exception that half of the coke Ranco 9895 was replaced by a 50/50 mixture of gas calcined anthracite and metallurgical coke. The same foam properties of foam with slightly deteriorated lambda were obtained.

Example 8 (Geopolymer Composite 5 Used)

This example is comparable to Example 7. Butadiene-styrene was added to the geopolymer composite. The geopolymer was firstly functionalized with use of acrylic-based silane, to incorporate double bonds into the aluminosilicate structure. These double bonds later reacted cross-linked with latex unsaturated bonds, to form a hybrid material. Such modified geopolymer composite powder has a better cohesion to the EPS polymer, thus mechanical properties could be improved, as well as "lambda", because less agglomeration during extrusion process took place. The properties of foam were improved despite of a higher content of geopolymer composite due to the need to keep the same concentration level of geopolymer phase in the foam.

Example 9 (Geopolymer Composite 6 Used)

In this example, the geopolymer composite was modified with use of phosphoric acid, as applied via washing of the precipitate cake in the filter press. The improvement is shown by reducing the amount of Emerald 3000 to 0.4 wt. % in the EPS foam. The self-extinguishing properties were obtained as presented in Table 8. With modification by phosphoric acid (5 wt. %), the self-extinguishing of EPS foam at the lowered content of Emerald 3000 was maintained on a satisfactory level.

Example 10 (Geopolymer Composite 7 Used)

This example is comparable with Example 9. The content of phosphoric acid in the powder was increased up to 10 wt. %. The same content of Emerald 3000 was kept and the self-extinguishing of foam EPS was improved. The self-extinguishing properties were obtained as presented in Table 9. This was figured out for example with geopolymeric additive modified by phosphoric acid that there is a different behaviour of samples during the test relying on better heat absorption by the foam, thus more intensive melting of samples was observed, however, no ignition or flaming was observed especially for sample 10.

Example 11 (Geopolymer Composite 8 Used)

This example is comparable with Example 9, but instead of phosphoric acid, the water solution of ammonium polyphosphate (Exolit AP 420) was used for the geopolymer composite modification. To show the self-extinguishing improvement, the Emerald 3000 content was reduced to 0.3 wt. %. The self-extinguishing properties as obtained are presented in Table 10.

Example 12 (Geopolymer Composite 9 Used)

This example is comparable with Example 11, but the modification with the use of ammonium polyphosphate (Exolit AP 420) solution was performed in a repulpation step, where APP was dosed instead of hydrochloric acid. The same properties of EPS foam as for Example 11 were obtained.

Example 13 (Geopolymer Composite 10 Used)

This example shows how modification of geopolymer composite via ion exchange step could be modified. In this example, copper chloride was used and an improvement of "lambda" reduction is shown.

TABLE 2

DIN 4102 B2

| Sample | Maturing time (days) | Flame height (cm) | Flaming time (s) | Dripping | Ignition |
|---|---|---|---|---|---|
| EXAMPLE 1 | 5 | 0.0 | 0 | 0 | NO |
| | | 0.0 | 0 | 0 | NO |
| | | 0.0 | 0 | 0 | NO |
| | | 0.0 | 0 | 0 | NO |
| | | 6.8 | 9 | 3 | NO |

TABLE 3

DIN 4102 B2

| Sample | Maturing time (days) | Flame height (cm) | Flaming time (s) | Dripping | Ignition |
|---|---|---|---|---|---|
| EXAMPLE 2 | 3 | 10.4 | 18 | 2 | NO |
| | | 11.8 | >20 | 2 | NO |
| | | 0.0 | 0 | 0 | NO |
| | | 0.0 | 0 | 0 | NO |
| | | 2.7 | 9 | 0 | NO |

TABLE 4

DIN 4102 B2

| Sample | Maturing time (days) | Flame height (cm) | Flaming time (s) | Dripping | Ignition |
|---|---|---|---|---|---|
| EXAMPLE 3 | 5 | 0.0 | 0 | 0 | NO |
| | | 0.0 | 0 | 0 | NO |
| | | 4.6 | >20 | 0 | NO |
| | | 16.9 | >20 | 5 | YES |
| | | 16.7 | >20 | 7 | YES |

TABLE 5

DIN 4102 B2

| Sample | Maturing time (days) | Flame height (cm) | Flaming time (s) | Dripping | Pater ignition |
|---|---|---|---|---|---|
| EXAMPLE 4 | 5 | 0 | 0 | 0 | NO |
| | | 0 | 0 | 0 | NO |
| | | 0 | 0 | 0 | NO |
| | | 0 | 0 | 0 | NO |
| | | 0 | 0 | 0 | NO |

TABLE 6

DIN 4102 B2

| Sample | Maturing time (days) | Flame height (cm) | Flaming time (s) | Dripping | Pater ignition |
|---|---|---|---|---|---|
| EXAMPLE 5 | 5 | 7.1 | 20 | 1 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 7

| Sample | Maturing time (days) | Flame height (cm) | Flaming time (s) | Dripping | Pater ignition |
|---|---|---|---|---|---|
| EXAMPLE 6 | 5 | 0.0 | 0 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

DIN 4102 B2

TABLE 8

DIN 4102 B2

| Sample | Maturing time (days) | Flame height (cm) | Flaming time (s) | Dripping | Pater ignition |
|---|---|---|---|---|---|
| EXAMPLE 9 | 5 | 9.4 | 14 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 9

DIN 4102 B2

| Sample | Maturing time (days) | Flame height (cm) | Flaming time (s) | Dripping | Pater ignition |
|---|---|---|---|---|---|
| EXAMPLE 10 | 5 | 0.0 | 0 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 10

DIN 4102 B2

| Sample | Maturing time (days) | Flame height (cm) | Flaming time (s) | Dripping | Pater ignition |
|---|---|---|---|---|---|
| EXAMPLE 11 | 5 | 0.0 | 0 | 0 | NO |
| | | 0.0 | 0 | 0 | NO |
| | | 0.0 | 0 | 0 | NO |
| | | 0.0 | 0 | 0 | NO |
| | | 0.0 | 0 | 0 | NO |

TABLE 11.1

Examples summary for prepared EPS foams.

| Ex. | 1 | 2 | 3 | 4 | 5 | 6 | 7 | 8 | 9 | 10 |
|---|---|---|---|---|---|---|---|---|---|---|
| Synthos PS585X | YES | YES | YES | YES | YES | YES | YES | YES | YES | YES |
| Geopolymer composite (wt. %)/type/ | 10/1/ | 10/1/ | 10/1/ | 10/2/ | 10/2/ | 10/3/ | 10/4/ | 12.5/5/ | 11.0/6/ | 12.2/7/ |
| Emerald 3000 (wt. %) | 1.5 | 1.0 | 0.75 | 0.75 | 0.5 | 0.5 | 0.5 | 0.5 | 0.4 | 0.4 |
| Ex. | 1 | 2 | 3 | 4 | 5 | 6 | 7 | 8 | 9 | 10 |
| Bicumyl (wt. %) | 0.3 | 0.2 | 0.15 | 0.15 | 0.1 | 0.1 | 0.1 | 0.1 | 0.08 | 0.08 |
| Polywax 2000 (wt. %) | 0.15 | 0.15 | 0.15 | 0.15 | 0.15 | 0.15 | 0.15 | 0.15 | 0.15 | 0.15 |
| Pentane/ Isopentane 80/20 (wt. %) | 5.5 | 5.5 | 5.5 | 5.5 | 5.5 | 5.5 | 5.5 | 5.5 | 5.5 | 5.5 |

TABLE 11.2

Examples summary for prepared EPS foams.

| | Examples | | |
|---|---|---|---|
| | 11 | 12 | 13 |
| Synthos PS 585X | YES | YES | YES |
| Geopolymer composite (wt. %) /type/ | 11 /8/ | 11 /9/ | 11 /10/ |
| Emerald 3000 (wt. %) | 0.3 | 0.3 | 0.4 |
| Bicumyl (wt. %) | 0.06 | 0.06 | 0.08 |
| Polywax 2000 (wt. %) | 0.15 | 0.15 | 0.15 |
| Pentane/Isopentane 80/20 (wt. %) | 5.5 | 5.5 | 5.5 |

TABLE 12

Expanded foam composite parameters at ca. 15.0 kg/m³.

| Examples | 1 | 2 | 3 | 4 | 5 | 6 | 7 | 8 | 9 | 10 | 11 | 12 | 13 |
|---|---|---|---|---|---|---|---|---|---|---|---|---|---|
| Dimensional stability at temp. 70° C. and humidity 50 ± 5% (% of shape change) | 0.10 | 0.10 | 0.20 | 0.15 | 0.11 | 0.1 | 0.1 | 0.1 | 0.1 | 0.1 | 0.1 | 0.1 | 0.1 |
| Thermal conductivity (mW/m · K) | 30.5 | 30.6 | 30.7 | 30.4 | 30.5 | 30.6 | 31.0 | 30.2 | 30.4 | 30.5 | 30.6 | 30.6 | 30.2 |
| Flammability (EN standard) | + | + | − | + | + | + | + | + | + | + | + | + | + |
| Flammability (DIN B2 standard) | + | − | − | + | − | + | + | + | + | + | + | + | + |
| Compressive strength at 10% def. (kPa) | 65 | 70 | 69 | 68 | 72 | 73 | 75 | 85 | 62 | 61 | 63 | 64 | 66 |
| Bending strength (kPa) | 130 | 134 | 131 | 129 | 133 | 135 | 134 | 142 | 130 | 127 | 128 | 129 | 130 |

Passed (+);

Not passed (−)

The invention claimed is:

1. Composition comprising one or more polymers, the composition further comprising
   a. a modified geopolymer composite derived from geopolymer, modified with one or more compounds selected from phosphorus compounds, nitrogen compounds, copper compounds, silver compounds, zinc compounds, tin compounds, and magnesium compounds, the modified geopolymer composite further comprising additive,
   wherein the modified geopolymer composite has a mean particle size in the range of from 0.1 to 200 µm.

2. The composition of claim 1 in the form of expandable vinyl aromatic polymer granulate comprising vinyl aromatic polymer and one or more propellants.

3. The granulate of claim 2, wherein the vinyl aromatic polymer granulate is obtainable by an extrusion or a suspension process.

4. The granulate of claim 2, wherein the additive is an athermanous additive.

5. The granulate of claim 4, wherein the athermanous additive is selected from the group consisting of
   a. carbon-based athermanous additives,
   b. metal athermanous additives,
   c. metal oxide athermanous additives, and
   d. metal sulfide athermanous additives.

6. The granulate of claim 2, wherein the modification is with a phosphorus compound.

7. The granulate of claim 6, wherein the modification is with a phosphorus compound selected from phosphoric acid and ammonium polyphosphate.

8. The granulate of claim 2, comprising silane in an amount of 0.1 to 3 wt. %, based on the weight of modified geopolymer composite.

9. The granulate of claim 8, wherein the silane is selected from aminopropyltriethoxysilane, aminopropyltrimethoxysilane, phenyltriethoxysilane, 3-methacryloxypropyltrimethoxysilane, and mixtures thereof.

10. The composition of claim 1 in the form of expanded vinyl polymer foam,
    the foam having
    a density of from 8 to 30 kg/m³, and
    a thermal conductivity (as measured according to ISO 8301) of from 25 to 35 mW/K·m.

11. The expanded vinyl polymer foam of claim 10, wherein the vinyl polymer is vinyl aromatic polymer.

12. The composition of claim 1 in the form of a masterbatch comprising vinyl polymer, and
    wherein the amount of modified geopolymer composite is in a range of from 10 to 70 wt. %, based on the weight of the masterbatch.

13. The masterbatch according to claim 12, wherein the vinyl polymer is a vinyl aromatic polymer.

14. The masterbatch according to claim 12, further comprising one or more silanes.

15. The masterbatch of claim 12, wherein the amount of geopolymer composite is in a range of from 10 to 65 wt. %, based on the weight of the masterbatch.

16. The masterbatch of claim 15, wherein the amount of geopolymer composite is in a range of from 20 to 60 wt. %.

17. The masterbatch of claim 16, wherein the amount of geopolymer composite is in a range of from 25 to 55 wt. %.

* * * * *